(12) United States Patent
Pockat et al.

(10) Patent No.: US 8,668,969 B2
(45) Date of Patent: *Mar. 11, 2014

(54) MYOGLOBIN BLOOMING AGENT CONTAINING SHRINK FILMS, PACKAGES AND METHODS FOR PACKAGING

(75) Inventors: Gregory Robert Pockat, Ripon, WI (US); Thomas Andrew Schell, Winneconne, WI (US); Dan G. Siegel, Belleville, IL (US); Kevin Philip Nelson, Appleton, WI (US); Otacilio Teixeira Berbert, Oshkosh, WI (US)

(73) Assignee: Curwood, Inc., Oskkosh, WI (US)

( * ) Notice: Subject to any disclaimer, the term of this patent is extended or adjusted under 35 U.S.C. 154(b) by 488 days.

This patent is subject to a terminal disclaimer.

(21) Appl. No.: 12/796,783

(22) Filed: Jun. 9, 2010

(65) Prior Publication Data

US 2010/0266795 A1 Oct. 21, 2010

Related U.S. Application Data

(60) Division of application No. 11/413,504, filed on Apr. 28, 2006, now Pat. No. 7,867,531, which is a continuation-in-part of application No. PCT/US2005/011387, filed on Apr. 20, 2005.

(51) Int. Cl.
*B32B 23/00* (2006.01)
*B32B 1/02* (2006.01)

(52) U.S. Cl.
USPC ....... 428/34.1; 428/34.2; 428/35.7; 428/35.9; 428/36.9

(58) Field of Classification Search
USPC ............ 428/34.1, 34.2, 35.7, 35.9, 36.9
See application file for complete search history.

(56) References Cited

U.S. PATENT DOCUMENTS

| 2,101,547 | A | 12/1937 | Kistler | 99/159 |
| 2,147,261 | A | 2/1939 | Lewis | 99/107 |
| 2,417,889 | A | 3/1947 | Stammelman | |
| 2,528,204 | A | 10/1950 | Zwosta | |
| 2,621,129 | A | 12/1952 | Ramsbottom et al. | |
| 2,788,278 | A | 4/1957 | Zimont et al. | |
| 2,863,777 | A | 12/1958 | Dekker | |
| 2,895,270 | A | 7/1959 | Blaess | 53/21 |
| 2,902,369 | A | 9/1959 | Komarik | 99/159 |
| 2,923,632 | A | 2/1960 | Castberg | |
| 2,925,346 | A | 2/1960 | Harper et al. | |
| 2,979,410 | A | 4/1961 | Parlour | 99/171 |

(Continued)

FOREIGN PATENT DOCUMENTS

CA 857827 12/1970
CA 878423 8/1971

(Continued)

OTHER PUBLICATIONS

Sacharow, S.; Griffin, R.C.; *Food Packaging*; AVI Publishing: Westport, CT, 1970; "Red Meats," pp. 95-119.

(Continued)

*Primary Examiner* — Marc Patterson
(74) *Attorney, Agent, or Firm* — Tom J. Hall

(57) ABSTRACT

Heat shrinkable, oxygen barrier, packaging films, methods of packaging and packages are provided having a myoglobin blooming agent to provide, promote, enhance or maintain a desirable coloration on the surface of a myoglobin-containing meat product.

24 Claims, 3 Drawing Sheets

(56) References Cited

U.S. PATENT DOCUMENTS

| | | | |
|---|---|---|---|
| 2,992,600 A | 7/1961 | Lancaster | |
| 3,003,883 A | 10/1961 | Levy | 99/159 |
| 3,042,532 A | 7/1962 | Daline | |
| 3,047,403 A | 7/1962 | McConnell | |
| 3,134,678 A | 5/1964 | Wierbicki et al. | |
| 3,154,423 A | 10/1964 | Voegeli et al. | 99/222 |
| 3,215,540 A | 11/1965 | Wierbicki et al. | |
| 3,355,319 A | 11/1967 | Rees | |
| 3,360,381 A | 12/1967 | Tarladgis | |
| 3,361,577 A | 1/1968 | Simon et al. | |
| 3,378,379 A | 4/1968 | Shiner et al. | |
| 3,384,993 A | 5/1968 | Kane | 47/58 |
| 3,451,827 A | 6/1969 | Bridgeford | |
| 3,456,044 A | 7/1969 | Pahlke | |
| 3,526,521 A | 9/1970 | Komarik | |
| 3,537,864 A | 11/1970 | Magiera | |
| 3,590,528 A | 7/1971 | Shepherd | C08F 3/02 |
| 3,645,757 A | 2/1972 | Gordon et al. | |
| 3,666,488 A | 5/1972 | Nakao et al. | 99/107 |
| 3,713,849 A | 1/1973 | Grindrod et al. | |
| 3,740,236 A | 6/1973 | Baxley | |
| 3,741,253 A | 6/1973 | Brax et al. | |
| 3,814,821 A | 6/1974 | Oliver et al. | |
| 3,821,438 A | 6/1974 | Brown | |
| 3,835,618 A | 9/1974 | Perdue | |
| 3,849,241 A | 11/1974 | Butin et al. | |
| 3,911,146 A | 10/1975 | Hara et al. | 426/265 |
| 3,936,560 A | 2/1976 | Santurri et al. | 428/219 |
| 3,950,919 A | 4/1976 | Perdue | |
| 3,966,045 A | 6/1976 | Perdue | |
| 3,966,974 A | 6/1976 | Bharucha et al. | |
| 4,001,445 A | 1/1977 | Horrocks et al. | |
| 4,001,446 A | 1/1977 | Hood | |
| 4,013,797 A | 3/1977 | Gryczka | |
| 4,053,650 A | 10/1977 | Chino et al. | |
| 4,055,672 A | 10/1977 | Hirsch et al. | |
| 4,064,296 A | 12/1977 | Bornstein et al. | |
| 4,089,983 A | 5/1978 | Hood | |
| RE30,009 E | 5/1979 | Perdue et al. | |
| 4,161,545 A | 7/1979 | Green et al. | |
| 4,196,220 A | 4/1980 | Chiu et al. | |
| 4,289,832 A | 9/1981 | Schwarz | |
| 4,308,289 A | 12/1981 | Huisman et al. | |
| 4,391,862 A | 7/1983 | Bornstein et al. | |
| 4,397,891 A | 8/1983 | Kaelberer et al. | |
| 4,407,897 A | 10/1983 | Farrell et al. | B32B 9/00 |
| 4,416,909 A | 11/1983 | Aversano | 426/265 |
| 4,420,530 A | 12/1983 | Toyoda et al. | B32B 5/16 |
| 4,425,395 A | 1/1984 | Negishi et al. | |
| 4,425,410 A | 1/1984 | Farrell et al. | B32B 9/00 |
| 4,448,792 A | 5/1984 | Schirmer | |
| 4,457,960 A | 7/1984 | Newsome | |
| 4,476,112 A * | 10/1984 | Aversano | 426/268 |
| 4,499,225 A | 2/1985 | Kubo et al. | C08L 91/06 |
| 4,501,758 A | 2/1985 | Morris | |
| 4,510,914 A | 4/1985 | Purser | |
| 4,522,835 A | 6/1985 | Woodruff et al. | |
| 4,543,260 A | 9/1985 | Brotsky | |
| 4,610,914 A | 9/1986 | Newsome | |
| 4,611,456 A | 9/1986 | Gillio-tos et al. | |
| 4,642,239 A | 2/1987 | Ferrar et al. | 426/396 |
| 4,683,139 A | 7/1987 | Cheng | |
| 4,728,518 A | 3/1988 | Gonzalez et al. | |
| 4,737,391 A | 4/1988 | Lustig et al. | |
| 4,753,809 A | 6/1988 | Webb | |
| 4,755,403 A | 7/1988 | Ferguson | |
| 4,755,419 A | 7/1988 | Shah | |
| 4,756,914 A | 7/1988 | Jon et al. | |
| 4,770,944 A | 9/1988 | Farrell et al. | B32B 27/08 |
| 4,781,934 A | 11/1988 | Shimp et al. | |
| 4,792,484 A | 12/1988 | Moritani | B32B 5/16 |
| 4,801,486 A | 1/1989 | Quacquarella et al. | |
| 4,810,541 A | 3/1989 | Newman et al. | |
| 4,818,548 A | 4/1989 | Cheng | |
| 4,877,846 A | 10/1989 | Chung | |
| 4,929,480 A | 5/1990 | Midkiff et al. | |
| 4,929,482 A | 5/1990 | Moritani et al. | B65D 81/26 |
| 4,954,526 A | 9/1990 | Keefer | |
| 4,960,639 A | 10/1990 | Oda et al. | B32B 5/16 |
| 4,962,728 A | 10/1990 | Highfill | 119/3 |
| 4,981,707 A | 1/1991 | Morris | |
| 4,990,184 A | 2/1991 | Dotson et al. | C09D 5/08 |
| 5,039,705 A | 8/1991 | Keefer et al. | |
| 5,047,253 A | 9/1991 | Juhl et al. | |
| 5,055,328 A | 10/1991 | Evert et al. | |
| 5,058,761 A | 10/1991 | Williams | |
| 5,063,644 A | 11/1991 | Herrington et al. | |
| 5,108,804 A | 4/1992 | Oxley et al. | |
| 5,139,700 A | 8/1992 | Miksic et al. | |
| 5,153,038 A | 10/1992 | Koyama et al. | B32B 27/04 |
| 5,155,137 A | 10/1992 | Keefer et al. | |
| 5,209,869 A | 5/1993 | Miksic et al. | |
| 5,221,566 A | 6/1993 | Tokoh et al. | |
| 5,223,311 A | 6/1993 | Tsutsumi et al. | |
| 5,230,915 A | 7/1993 | Shahidi et al. | 426/240 |
| 5,256,458 A | 10/1993 | Oxley et al. | |
| 5,281,471 A | 1/1994 | Diete et al. | |
| 5,288,532 A | 2/1994 | Juhl et al. | |
| 5,301,394 A | 4/1994 | Richardson et al. | |
| 5,317,052 A | 5/1994 | Ohba et al. | |
| 5,352,467 A | 10/1994 | Mitchell et al. | |
| 5,374,457 A | 12/1994 | Juhl et al. | |
| 5,382,391 A | 1/1995 | Juhl et al. | |
| 5,382,470 A | 1/1995 | Vicik | |
| 5,384,149 A | 1/1995 | Lin | |
| 5,393,457 A | 2/1995 | Miksic et al. | |
| 5,405,857 A | 4/1995 | Karup et al. | |
| 5,407,611 A | 4/1995 | Wilhoit et al. | |
| 5,416,131 A | 5/1995 | Wolff et al. | B05D 3/00 |
| 5,425,956 A | 6/1995 | Shahidi et al. | 426/92 |
| 5,442,837 A | 8/1995 | Morgan | |
| 5,443,852 A | 8/1995 | Shahidi et al. | 426/92 |
| 5,472,722 A | 12/1995 | Burger | 426/264 |
| 5,481,852 A | 1/1996 | Mitchell | 53/432 |
| RE35,285 E | 6/1996 | Quacquarella et al. | |
| 5,525,357 A | 6/1996 | Keefer et al. | |
| 5,558,891 A | 9/1996 | Lawless et al. | |
| 5,573,797 A | 11/1996 | Wilhoit | |
| 5,573,800 A | 11/1996 | Wilhoit | |
| 5,573,801 A | 11/1996 | Wilhoit | |
| 5,591,468 A | 1/1997 | Stockley, III et al. | |
| 5,593,747 A | 1/1997 | Georgelos | |
| 5,597,599 A | 1/1997 | Smith et al. | |
| 5,663,002 A | 9/1997 | Schirmer | |
| 5,667,827 A | 9/1997 | Breen et al. | 426/129 |
| 5,711,978 A | 1/1998 | Breen et al. | 426/129 |
| 5,715,945 A | 2/1998 | Chandler | B65D 85/84 |
| 5,759,648 A | 6/1998 | Idlas | |
| 5,759,650 A | 6/1998 | Raines et al. | |
| 5,770,645 A | 6/1998 | Stamler et al. | |
| 5,800,412 A | 9/1998 | Zhang et al. | |
| 5,834,077 A | 11/1998 | Babrowicz | |
| 5,834,098 A | 11/1998 | Kitamura et al. | |
| 5,840,381 A | 11/1998 | Ohtsuka | |
| 5,845,769 A | 12/1998 | Yeager | |
| 5,846,582 A | 12/1998 | Mayfield et al. | |
| 5,855,975 A | 1/1999 | Miksic et al. | |
| 5,866,184 A | 2/1999 | Gorlich et al. | |
| 5,888,528 A | 3/1999 | Wellinghoff et al. | |
| 5,894,040 A | 4/1999 | Foley et al. | B27M 1/08 |
| 5,895,587 A | 4/1999 | Sorensen | |
| 5,916,613 A | 6/1999 | Stockley | |
| 5,928,770 A | 7/1999 | Quinones | |
| 5,937,618 A | 8/1999 | Chandler | B65B 11/52 |
| 5,958,805 A | 9/1999 | Quinones | |
| 5,964,532 A | 10/1999 | Phillips et al. | |
| 5,965,264 A | 10/1999 | Barenberg et al. | |
| 5,989,610 A | 11/1999 | Ruzek | 426/281 |
| 5,989,613 A | 11/1999 | Buchko | |
| 5,994,444 A | 11/1999 | Trescony et al. | C08K 3/28 |
| 6,020,012 A | 2/2000 | Kauffman et al. | |
| 6,028,160 A | 2/2000 | Chandler et al. | |
| 6,033,599 A | 3/2000 | Lozano et al. | |
| 6,033,705 A | 3/2000 | Isaacs | |

(56) References Cited

U.S. PATENT DOCUMENTS

| | | | |
|---|---|---|---|
| 6,042,859 A | 3/2000 | Shaklai | |
| 6,046,243 A | 4/2000 | Wellinghoff et al. | |
| 6,068,933 A | 5/2000 | Shepard et al. | |
| 6,074,715 A | 6/2000 | Lind et al. | |
| 6,087,479 A | 7/2000 | Stamler et al. | |
| 6,099,881 A | 8/2000 | Hanson | 426/263 |
| 6,113,962 A | 9/2000 | Spencer | 423/316 |
| 6,143,344 A | 11/2000 | Jon et al. | |
| 6,204,223 B1 | 3/2001 | Holmes et al. | |
| 6,210,725 B1 | 4/2001 | Colombo | B65D 85/00 |
| 6,221,470 B1 | 4/2001 | Ciocca et al. | |
| RE37,171 E | 5/2001 | Busche et al. | |
| 6,232,434 B1 | 5/2001 | Stamler et al. | |
| 6,242,371 B1 | 6/2001 | Quinones | |
| 6,270,829 B1 | 8/2001 | Shahlai | |
| 6,270,873 B1 | 8/2001 | Darnett | |
| 6,287,613 B1 | 9/2001 | Childress et al. | |
| 6,299,984 B1 | 10/2001 | Forloni | |
| 6,316,067 B1 | 11/2001 | Edwards et al. | |
| 6,403,759 B2 | 6/2002 | Stamler et al. | |
| 6,409,384 B1 | 6/2002 | Provan et al. | |
| 6,420,470 B1 | 7/2002 | Miksic et al. | |
| 6,439,770 B2 | 8/2002 | Catchman | |
| 6,447,826 B1* | 9/2002 | Matthews | 426/126 |
| 6,465,109 B2 | 10/2002 | Ohtsuka | B32B 27/32 |
| 6,500,473 B1 | 12/2002 | Koehler et al. | |
| 6,511,568 B1 | 1/2003 | Eckstein et al. | |
| 6,514,583 B1 | 2/2003 | Ahlgren et al. | |
| 6,521,275 B1 | 2/2003 | Mercogliano et al. | |
| 6,524,002 B2 | 2/2003 | Tomic | |
| 6,527,444 B1 | 3/2003 | Buchman | |
| 6,533,962 B1 | 3/2003 | Tulka et al. | |
| 6,562,476 B2 | 5/2003 | Shepard et al. | |
| 6,565,985 B2 | 5/2003 | Ueyama et al. | |
| 6,592,919 B1 | 7/2003 | Matthews et al. | |
| 6,602,466 B2 | 8/2003 | Hamilton et al. | A61L 9/00 |
| 6,609,827 B2 | 8/2003 | Bois et al. | |
| 6,610,392 B1 | 8/2003 | Ramesh et al. | |
| 6,616,333 B2 | 9/2003 | Kinigakis et al. | |
| 6,617,041 B2 | 9/2003 | Hahn et al. | |
| 6,623,773 B2* | 9/2003 | Meier et al. | 426/132 |
| 6,632,021 B2 | 10/2003 | Bois et al. | |
| 6,632,785 B2 | 10/2003 | Pfeiffer et al. | C11D 3/22 |
| 6,651,874 B1 | 11/2003 | Pedersen | |
| 6,663,283 B1 | 12/2003 | Cappel | |
| 6,666,580 B2 | 12/2003 | Bois | |
| 6,667,082 B2 | 12/2003 | Bamore et al. | |
| 6,673,465 B2 | 1/2004 | Lordi | |
| 6,673,891 B2 | 1/2004 | Stamler et al. | |
| 6,682,825 B1 | 1/2004 | Kennedy et al. | |
| 6,689,403 B1 | 2/2004 | Gehring et al. | |
| 6,689,460 B2 | 2/2004 | Wen et al. | |
| 6,699,549 B1 | 3/2004 | Ueyama et al. | |
| 6,706,274 B2 | 3/2004 | Herrmann et al. | A61F 2/00 |
| 6,716,464 B1 | 4/2004 | Schlegel et al. | 426/312 |
| 6,739,113 B1* | 5/2004 | Kocher et al. | 53/442 |
| 6,749,910 B1 | 6/2004 | Georgelos et al. | |
| 6,753,054 B1 | 6/2004 | Lind et al. | |
| 6,769,227 B2 | 8/2004 | Mumpower et al. | |
| 6,773,820 B1 | 8/2004 | Wilhoit et al. | |
| 6,777,046 B1 | 8/2004 | Tatarka et al. | |
| 6,815,023 B1 | 11/2004 | Tatarka et al. | |
| 6,858,275 B2 | 2/2005 | Ferri et al. | |
| 6,861,125 B1 | 3/2005 | Carlson et al. | |
| 6,861,127 B2 | 3/2005 | Glawe et al. | |
| 6,869,686 B1 | 3/2005 | Idlas | |
| 6,875,840 B2 | 4/2005 | Stamler et al. | |
| 6,879,027 B2 | 4/2005 | Sato | |
| 6,881,430 B2 | 4/2005 | Køhler et al. | |
| 6,887,994 B2 | 5/2005 | Stamler et al. | |
| 6,939,569 B1 | 9/2005 | Green et al. | A61K 33/08 |
| 6,942,909 B2 | 9/2005 | Shirrell et al. | B32B 27/32 |
| 6,942,927 B2 | 9/2005 | Shepard et al. | |
| 6,945,402 B1 | 9/2005 | Gueret | |
| 6,964,816 B2 | 11/2005 | Schell et al. | |
| 7,017,774 B2 | 3/2006 | Haedt | |
| 7,018,719 B2 | 3/2006 | Ueyama et al. | |
| 7,037,543 B2 | 5/2006 | Sandusky et al. | 426/129 |
| 7,335,327 B2 | 2/2008 | Grah et al. | |
| 7,422,923 B2 | 9/2008 | Kojima et al. | |
| 8,087,479 B2 | 1/2012 | Kulkarni et al. | |
| 8,110,259 B2* | 2/2012 | Siegel et al. | 428/34.1 |
| 2001/0055640 A1 | 12/2001 | Meier et al. | |
| 2002/0051754 A1 | 5/2002 | Schroeder et al. | |
| 2002/0097923 A1 | 7/2002 | Dobreski et al. | |
| 2002/0102405 A1 | 8/2002 | Chapman et al. | |
| 2002/0119220 A1 | 8/2002 | Costello | A23B 4/00 |
| 2002/0172834 A1* | 11/2002 | Rivett et al. | 428/515 |
| 2002/0196987 A1 | 12/2002 | Tilman et al. | |
| 2002/0197467 A1 | 12/2002 | Johnson | |
| 2003/0017194 A1 | 1/2003 | Joerger et al. | |
| 2003/0039724 A1 | 2/2003 | DuCharme et al. | 426/135 |
| 2003/0044492 A1 | 3/2003 | Knigge et al. | |
| 2003/0203081 A1 | 10/2003 | Saari et al. | A61L 9/04 |
| 2003/0235664 A1 | 12/2003 | Merical et al. | |
| 2004/0009273 A1 | 1/2004 | Shaklai | |
| 2004/0039683 A1 | 2/2004 | Mcgeorge | |
| 2004/0076845 A1 | 4/2004 | Albright | B32B 5/16 |
| 2004/0097630 A1* | 5/2004 | Whitman et al. | 524/445 |
| 2004/0131805 A1 | 7/2004 | Merical et al. | |
| 2004/0137202 A1 | 7/2004 | Hamilton et al. | |
| 2004/0151853 A1 | 8/2004 | Shirrell et al. | |
| 2004/0166262 A1 | 8/2004 | Busche et al. | |
| 2005/0011387 A1 | 1/2005 | Schneider et al. | |
| 2005/0019537 A1 | 1/2005 | Nakaishi et al. | B32B 27/08 |
| 2005/0059655 A1 | 3/2005 | Garvey et al. | |
| 2005/0084636 A1 | 4/2005 | Papenfus et al. | |
| 2005/0089607 A1 | 4/2005 | Numata et al. | |
| 2005/0106380 A1 | 5/2005 | Gray et al. | B32B 5/16 |
| 2005/0129969 A1 | 6/2005 | Schell et al. | |
| 2005/0249848 A1 | 11/2005 | Charest et al. | |
| 2005/0254731 A1 | 11/2005 | Berbert et al. | |
| 2007/0014953 A1 | 1/2007 | Siegel et al. | |
| 2007/0246867 A1 | 10/2007 | Nelson et al. | |

FOREIGN PATENT DOCUMENTS

| | | | |
|---|---|---|---|
| CA | 905744 | 7/1972 | 99/97 |
| CA | 1053497 | 5/1979 | 99/19 |
| CA | 1329890 | 5/1994 | 99/18 |
| CA | 2007522 | 3/2000 | |
| CA | 2230614 | 4/2001 | |
| CA | 2100074 | 8/2003 | |
| CA | 2500860 | 12/2009 | |
| DE | 2 363 258 A1 | 7/1974 | |
| DE | 2 415 659 A1 | 10/1974 | |
| DE | 24 51 337 A1 | 8/1975 | |
| EP | 0 013 556 A1 | 7/1980 | |
| EP | 0120503 | 10/1984 | |
| EP | 28113 B1 | 4/1985 | |
| EP | 0 172 432 A2 | 2/1986 | |
| EP | 0 202 771 A2 | 11/1986 | |
| EP | 0 224 990 A1 | 6/1987 | |
| EP | 0 364 624 A1 | 4/1990 | |
| EP | 0 491 164 A2 | 6/1992 | |
| EP | 0 473 091 B1 | 12/1995 | |
| EP | 0 662 527 B1 | 5/1997 | |
| EP | 1 138 478 A2 | 4/2001 | |
| EP | 0 788 319 B1 | 4/2002 | |
| FR | 2 634 976 | 2/1990 | |
| GB | 1 048 770 | 11/1966 | |
| GB | 1 253 449 A | 11/1971 | |
| GB | 1 475 994 A | 6/1977 | |
| GB | 2 187 081 A | 9/1987 | |
| JP | 57155975 | 9/1982 | |
| JP | 57-170175 A2 | 10/1982 | |
| JP | 57-170176 A2 | 10/1982 | |
| JP | 58073064 | 5/1983 | |
| JP | 58-101670 | 6/1983 | |
| JP | 59-085278 A | 5/1984 | |
| JP | 59178273 | 10/1984 | |
| JP | 64-071437 | 3/1989 | |
| JP | 01210340 A | 8/1989 | |
| JP | 04-318033 | 11/1992 | |

(56) References Cited

FOREIGN PATENT DOCUMENTS

| | | |
|---|---|---|
| JP | 05-140344 | 6/1993 |
| JP | 06-049247 A | 2/1994 |
| JP | 06049247 A | 2/1994 |
| JP | 07-258467 | 10/1995 |
| JP | 10313821 | 12/1998 |
| JP | 2000015737 A | 1/2000 |
| JP | 2000141535 A | 5/2000 |
| JP | 2001258468 | 9/2001 |
| JP | 2002125621 | 5/2002 |
| JP | 2003191420 A | 7/2003 |
| JP | 4066071 | 1/2008 |
| JP | 5140344 | 11/2012 |
| WO | WO 92/15454 A1 | 9/1992 |
| WO | WO 96/14760 A1 | 5/1995 |
| WO | WO 99/23143 A1 | 5/1999 |
| WO | WO 00/69775 A1 | 11/2000 |
| WO | WO 02/056904 A1 | 7/2002 |
| WO | WO 03009709 | 2/2003 |
| WO | WO 2004000541 A1 | 12/2003 |
| WO | WO 2004039683 | 5/2004 |
| WO | WO 2005097486 | 10/2005 |

OTHER PUBLICATIONS

McGee, H.; *On Food and Cooking: The Science and Lore of the Kitchen*, Scribner: New York, 1984, Chapter 3, "Meat" pp. 118-178.
Grayson, M.; *Kirk-Othmer Encyclopedia of Chemical Technology*, 3$^{rd}$ ed.; John Wiley & Sons: New York, 1981, vol. 15, "Meat Products", pp. 62-74.
Grayson, M.; *Kirk-Othmer Encyclopedia of Chemical Technology*, 3$^{rd}$ ed.; John Wiley & Sons: New York, 1981, vol. 11, "Food Additives", pp. 147-163.
Grayson, M.; *Kirk-Othmer Encyclopedia of Chemical Technology*, 3$^{rd}$ ed.; John Wiley & Sons: New York, 1981, vol. 11, "Food Processing", pp. 164-183.
Kroschwitz, J. I.; *Encyclopedia of Polymer Science and Technology*, Wiley Interscience: New Jersey, 2003, vol. 3, "Packaging, Flexible," 353-363.
Kroschwitz, J. I.; *Encyclopedia of Polymer Science and Technology*, Wiley Interscience: New Jersey, 2003, vol. 2, Coextrusion pp. 1-25.
Brody, A. L.; Marsh, K. S.; *The Wiley Encyclopedia of Packaging Technology*, 2$^{nd}$ ed.; John Wiley & Sons: 1997, Active Packaging, pp. 2-13.
Brody, A. L.; Marsh, K. S.; *The Wiley Encyclopedia of Packaging Technology*, 2$^{nd}$ ed.; John Wiley & Sons: 1997, Coextrusions for Flexible Packaging, pp. 237-240.
Brody, A. L.; Marsh, K.S.; *The Wiley Encyclopedia of Packaging Technology*, 2$^{nd}$ ed.; John Wiley & Sons: 1997, Form/Fill/Seal, Horizontal & Form/Fill/Seal, Vertical, pp. 465-470.
Brody, A. L.; Marsh, K. S.; *The Wiley Encyclopedia of Packaging Technology*, 2$^{nd}$ ed.; John Wiley & Sons: 1997, Packaging of Food, pp. 699-704.
Brody, A. L.; Marsh, K.S.; *The Wiley Encyclopedia of Packaging Technology*, 2$^{nd}$ ed.; John Wiley & Sons: 1997, Thermoform/Fill/Seal, pp. 910-921.
Brody, A. L.; Marsh, K. S.; *The Wiley Encyclopedia of Packaging Technology*, 2$^{nd}$ ed.; John Wiley & Sons: 1997, Trays, Barrier-Foam, pp. 931-937.
Brody, A. L.; Marsh, K. S.; *The Wiley Encyclopedia of Packaging Technology*, 2$^{nd}$ ed.; John Wiley & Sons: 1997, Vacuum Packaging, pp. 949-955.
Wang, P. G.; Cai, T. B.; Taniguchi, N.; *Nitric Oxide Donors*; Wiley-VCH: 2005, Chapter 1, "NO and NO Donors", pp. 3-31.
Han, J. H.; "Antimicrobial Food Packaging", in *Food Technology*, Mar. 2000, vol. 54, No. 3, pp. 56-65.
Hampe, D.; Piringer, O., "Studies on the permeation of inorganic salts through plastic films", *Food Additives and Contaminants*, 1998, vol. 15, No. 2, 209-216.
Vartianinen, J., Skytta, Enqvist, J., Ahvenainen, R., "Properties of Antimicrobial Plastics Containing Traditional Food Preservatives", in *Packaging Technology and Science*, 2003, 16, pp. 223-229.
Gasco, A.; Fruttero, R.; Sorba, G.; Di Stilo, A.; and Calvino, R., "NO donors: Focus on Furoxans Derivatives", in *Pure Appl. Chem.*, 2004, vol. 76, No. 5, pp. 973-981.
Wang, P. G.; Xian, M.; Tang, X.; Wu, X.; Wen, Z.; Cai, T.; and Janczuk, A. J., „Nitric Oxide Donors: Chemical Activities and Biological Applications, *Chem. Rev.*, 2002, 102, pp. 1091-1134.
Tovar, L.; Salafranca, J.; Sanchez, C.; and Nerin, C., "Migration Studies to Assess the Safety in Use of a New Antioxidant Active Packaging", *J. Agric. Food Chem.*, 2005, 53, pp. 5270-5275.
"Migration of Toxicants, Flavors, and Odor-Active Substances from Flexible Packaging Materials to Food", *Food Technology*, Jul. 1988, pp. 95-102.
"Nitrate, Nitrite, and Nitroso Compounds in Foods", *Food Technology*, Apr. 1987, pp. 127-136.
Heaton, K.M., Corformth, D.P., Moiseev, I.V., Egbert, W.R., Carpenter, C.E. "Minimum Sodium Nitrite Levels for pinking of various cooked meats as related to use of direct or indirect-dried soy isolates in poultry rolls", *Meat Science*, 2000, 55, pp. 321-329.
Sacharow, S.; Griffin, R.; *Food Packaging*; AVI Publishing: 1970, Chapter 3, "Red Meats", pp. 95-119.
Bureau, G.; Multon, J.L.; *Food Packaging Technology*, vol. 2, 1996, "Influence of the Absence of Oxygen on the Color of the Meat", pp. 239-242.
Kramlich, W.E.; Pearson, A.M.; Tauber, F.W., *Processed Meats*, The AVI Publishing Company, Inc., 1973, Chapter 1, "Introduction to Meat Processing", pp. 1-12.
Kramlich, W.E.; Pearson, A.M.; Tauber, F.W., *Processed Meats*, The AVI Publishing Company, Inc., 1973, Chapter 3, "Curing", pp. 40-60.
Meat & Deli Retailer, Mar. 2005, pp. 1-19.
Meat & Deli Retailer, Mar. 2005, pp. 22-46.
Gregerson, J.; *Meat Marketing & Technology*, Dec. 2005, "Seeing Red", p. 4.
Hisey, P.; *Meat Marketing & Technology*, Mar. 2005, "Open and shut case?", pp. 20-30.
Salvage, B.; *The National Provisioner*, Jun. 2005, "Case-ready penetration", pp. 96-105.
Schwarz, S. J., Claus, J.R.; Wang, H.; Marriott, N.G..; Graham, P.P.; Fernandes, C.F., "Inhibition of Pink Color Development in Cooked, Uncured Turkey Breast Through Ingredient Incorporation" in *Poultry Science* 1999, vol. 78, pp. 255-266.
Dymicky, M.; Fox, J.B.; Wasserm, A. E., Color Formation in Cooked Model and Meat Systems With Organic and Inorganic Compounds, in *J. Food Science* 1975, vol. 4, pp. 306-309.
Pegg, R. B.; Nitrite Curing of Meat: The N-Nitrosamine Problem and Nitrite Alternatives; in *Food & Nutrition*, Chapter 9, "Possible Substitutes for Nitrite", pp. 209-223.
McMillin, K.W. et al,; "Quality and Shelf-Life of Meat in Case-Ready Modidfied Atmosphere Packaging"; Quality Attributes of Muscle Foods; 1999; Plenum Publishers, New York.
Renerre, M. "Review; Factors involved in the discoloration of beef meat"; International Journal of Food Science & Technology; 1990; 25, pp. 613-630.
Summel, Lauren M.; "Chapter II: Review of the Literature—Myoglobin"; Ph.D. Thesis, Kansas State University; 2004.
Rizvi, Syed S. H.; "Requirements for Foods Packaged in Polymeric Films"; CRC Critical Reviews in Food Science & Nutrition; Feb. 1981; pp. 111-133.
Faustman, C. et al.; "The Biochemical Basis for Discoloration in Fresh Meat: A review"; Journal of Muscle Foods; Food & Nutrition Press, Inc.: 1990; pp. 217-233.
"The Eating Quality of Meat"; Meat Science; Pergamon Press; 5th Ed.; 1991; pp. 184-187.
Govindarajan, S.; "Fresh Meat Color"; CRC Critical Reviews in Food Technology; Sep. 1973; pp. 117-127.
Giddings, G.G.; "Symposium: The Basis of quality in Muscle Foods—The Basis of Color in Muscle Foods": Journal of Food Science; vol. 42, No, 2; 1997; pp. 288-294.
Maddock, R.; "Color Counts"; Operations & Technology; Oct. 2004; pp. 63-65.
Hermansen, P.; "Comparison of Modified Atmosphere Versus Vacuum Packaging to Extend the Shelf Life of Retail Fresh Meat Cuts"; Reciprocal Meat Conference Proceedings; V25'83.
Holland, G.C.; "Modified Atmospheres for Fresh Meat Distribution"; Meat Science; vol. 13(19): 1985; pp. 21-39.
Sebranek, Dr. J.G.; "'Meat is dynamic'—factors in controlled atmosphere packs"; The National Provisioner; May 10, 1986; pp. 10-16.
Kropf, D.; "Enhancing Meat Color Stability"; 56th Annual Reciprocal Meat Conference; Jun. 15-18, 2003; pp. 73-75.

(56) References Cited

OTHER PUBLICATIONS

Thippareddi, H. et al.; "Modified Atmosphere Packaging (MAP): Microbial Control & Quality"; FACTS National Pork Board; #04667; Oct. 2002; pp. 1-8.

Kropf, D.; "Meat Display Lighting"; FACTS National Pork Board; #04623; Feb. 2002; pp. 1-8.

Hunt, M. et al.; "Cooked Color in Pork"; FACTS National Pork Board; #01637; Mar. 2002; pp. 1-4.

Atkinson, J.L. et al.; "Biochemical studies on the discoloration of fresh meat"; Journal of Food Technology; vol. 8, pp. 51-58; 1973.

* cited by examiner

MYOGLOBIN BLOOMING AGENT CONTAINING SHRINK FILMS, PACKAGES AND METHODS FOR PACKAGING

RELATED APPLICATIONS

This is a divisional application of U.S. patent application Ser. No. 11/413,504 filed on Apr. 28, 2006 which is a continuation-in-part of International Application PCT/US2005/011387, with an international filing date of Apr. 4, 2005, published in English as WO 2005/097486 on Oct. 20, 2005, entitled "Improved Packaging Method that Causes and Maintains the Preferred Red Color of Fresh Meat," by Curwood, Inc., which are both incorporated herein by reference in their entireties.

TECHNICAL FIELD

Heat-shrinkable single and multilayer food packaging films, and food packages comprising the same, for maintaining desirable food color are provided herein, as well as related methods of food packaging.

BACKGROUND

Meat color is an important quality characteristic of meat that affects its merchandizability. Consumers often use color as an indicator of meat quality and freshness. The color of meat is related to the amount and chemical state of myoglobin in the meat. Myoglobin is present in the muscle tissue of all animals and functions to store and deliver oxygen by reversibly binding molecular oxygen, thereby creating an intracellular source of oxygen for the mitochondria. Pork and poultry typically contain lower amounts of myoglobin than beef and thus are lighter in color than beef.

Myoglobin includes an open binding site called heme that can bind certain small molecules, such as molecular oxygen ($O_2$ or "oxygen"), or water. Myoglobin without a molecule bound to the heme site is a purple colored molecule called deoxymoglobin. The presence and type of ligand bound at the myoglobin binding site can alter the color of the myoglobin. The color of the meat product will change based on the amount of myoglobin present and the amount and type(s) of ligand molecule(s) bound to the heme binding site. Molecular oxygen, $O_2$ ("oxygen") readily acts as a ligand that binds to the heme group, permitting biological transport of oxygen from the blood stream to the mitochondria within cells. When oxygen binds to the heme pocket, purple deoxymyoglobin becomes oxymyoglobin, characterized by a red color. When a water molecule binds to the heme group, the myoglobin molecule turns brown and is referred to as metmyoglobin. The binding of cyanide or fluorine to the heme site can cause a brown color, while the binding of carbon monoxide (CO) can cause a red color similar to that produced by oxygen binding. Nitric oxide (NO) has been described as forming a stable pink color in cured meat.

Historically, fresh meat products available to consumers have been substantially prepared and packaged for end-use at the site of final sale. Product packaging that preserves desirable color of fresh meat can promote the merchantability and appeal of the meat product for consumers. Existing meat packaging technology can inadequately preserve favorable meat color for various reasons. The conventional packaging format used by the retail grocer for fresh meat is to stretch a thin plastic film around a foam tray that supports the product. The film is permeable to oxygen so that the color of the meat quickly blooms to a bright red. However, the shelf life for the bright red color is only about three days. Thus, this packaging format is undesirable because the color often becomes unacceptable before it can be displayed or sold even though the meat remains nutritious and healthy for consumption. As a result, a packaging format that maintains the fresh meat color for a longer period of time has long been sought for centralized packaging operations. Alternatively, meat has been packaged in oxygen barrier, vacuum bags, which are vacuum sealed and prevent oxygen contact with the meat until the package is opened. Vacuum sealed red meat products are nutritious, healthy and have a long shelf life, however they may result in an undesirable purple meat color that does not bloom to a desirable red color until the meat is exposed to air. Consumer acceptance of meat having a purple color is less than that of meat having a red color. To provide meat with the consumer preferred red color meat has also been packaged in a modified atmosphere package ("MAP"), wherein the meat is maintained in a sealed pocket containing an atmosphere that is different than ambient air. For example, one such commercially acceptable MAP contains an atmosphere enriched with oxygen (up to 80% by volume) to better maintain a preferred red color. One case ready MAP maintains meat in carbon dioxide, with a very low oxygen content until just before display when the meat is exposed to oxygen to cause blooming to the desired red color. Alternatively, the meat can be contacted with a MAP having an atmosphere containing a small concentration of carbon monoxide (CO) (e.g. 0.4% by volume) to maintain a preferred red meat color. However, while CO-containing MAP can maintain a shelf life comparable to vacuum packaged meat, the red color induced by the presence of CO can be perceived as "unnaturally" bright red. In addition, the red color developed by CO tends to extend through a significant portion of the meat product, causing a permanent "pinking" of the interior of the meat which may remain even after the meat has been fully cooked. The bright red CO-myoglobin complex is referred to as carboxymyoglobin. The presence of carbon monoxide can also disfavorably impact sales of CO-containing MAP packages among consumers.

MAP also requires a headspace for contact of the modified atmosphere with the meat surface to effect the desired color over time. This requirement for a headspace leads to increased package volume, increased transportation costs and storage requirements and also limits the display appearance by making the product less visible due to the high side walls of the container and the gap between the film and the meat surface.

What is needed are packaging materials that maintain a favorable meat color, while providing an adequate or improved shelf life and meat freshness.

Nitrite or nitrate salts, such as sodium nitrite, are often used in curing meat, and can also affect meat color. Nitrate and nitrite additives are generally recognized as safe for use in foods, and are commonly known preservatives used in the curing process for products such as hams, lunchmeat, bologna and hot dogs. Nitrite and nitrates are used to cure and disinfect meats in the meat industry often producing a stable pink to red color in the process. For example, GB 2187081A discloses immersion of meat in an aqueous solution of sodium chloride, polyphosphate ions and nitrite ions to preserve meat. See also McGee, "Meat", *On Food and Cooking*, Rev. Ed., 2004, Chapter 3, pp. 118-178 (Scribner, New York, N.Y.) which is hereby incorporated by reference. The presence of oxygen can oxidize available nitric oxide to nitrite thus reducing its availability to associate with the myoglobin molecule. Packaging films have been described that comprise nitrite or nitrate compounds as a desiccant, a food preservative or as a volatile corrosion inhibitor for packaging of metal products. Anti-fungal agents including food preservatives such as sodium nitrite may be applied on various types of packaging to preserve biodegradable packaging against premature deleterious attack by fungi, as disclosed in JP7-258467A. Oxygen barrier films for packaging food products can contain a nitrate salt as a moisture-absorbing agent within an EVOH barrier material or other layer of a multilayer film, as disclosed in JP5-140344A, and U.S. Pat. No. 4,407,897 (Farrell et al.), U.S. Pat. No. 4,425,410 (Farrell et al.), U.S. Pat. No. 4,792,484 (Moritani), U.S. Pat. No. 4,929,482 (Moritani et al.), U.S. Pat. No. 4,960,639 (Oda et al.), and U.S. Pat. No. 5,153,038 (Koyama et al.). Nitrate or nitrite products have also been described as being included in packaging films to absorb moisture e.g. to inhibit corrosion of metal products, as disclosed in U.S. Pat. No. 2,895,270 (Blaess), U.S. Pat. No. 5,715,945 (Chandler), U.S. Pat. No. 5,894,040 (Foley et al.), U.S. Pat. No. 5,937,618 (Chandler), U.S. Pat. No. 6,465,109 (Ohtsuka), and U.S. Pat. No. 6,942,909 (Shirrell et al.), U.S. Published Patent Application No. 2005/0019537 (Nakaishi et al.), GB Patent No. 1,048,770 (Canadian Technical Tape, Ltd.), and EP Patent Nos. EP 0 202 771 B1 (Aicello Chemical Co. Ltd.), and EP 0 662 527 B1 (Cortec Corp.) and EP 1 138 478 A2 (Aicello Chemical Co. Ltd.). None of these barrier films teach a meat-contact portion comprising a nitrite or nitrate material adapted to maintain desirable coloration of a meat product.

In many packaging applications, such as vacuum packaging, heat shrinkable food packaging films are desirable. Heat shrinkable bags can be made from heat sealable films. A typical food packaging bag, pouch or casing can include one, two, or three sides heat sealed by the bag manufacturer leaving one or two open sides to allow product insertion.

Shrinkable films, bags, and casings have been used to package fresh, frozen and processed meats for wholesale or retail sale and as processing films for cook-in applications and post-cooking pasteurization processes. Meats cured with nitrites and/or nitrates have been packaged in shrink films. See e.g. U.S. Pat. No. 6,815,023 (Tatarka et al); U.S. Pat. No. 6,777,046 (Tatarka et al); U.S. Pat. No. 6,749,910 (Georgelos et al); U.S. Pat. No. 5,759,648 (Idlas); U.S. Pat. No. 5,472,722 (Burger); U.S. Pat. No. 5,047,253 (Juhl et al); and U.S. Pat. No. 4,391,862 (Bornstein et al).

What is needed are packaging products, such as heat-shrinkable films including a food-contact portion comprising a material adapted to maintain or promote the desirable coloration of a myoglobin containing food product especially fresh meat.

SUMMARY

In a first embodiment, heat shrinkable, oxygen barrier, packaging films are provided that comprise myoglobin blooming agent to maintain or promote desirable coloration of a meat product. The myoglobin blooming agent can comprise a molecule that interacts with the myoglobin present on the surface of the meat product to produce a color change and/or to maintain a favorable color in the meat product. Preferably, the myoglobin blooming agent is a compound that provides a nitric oxide ligand for binding to myoglobin, to promote or maintain a favorable red color on the meat surface. Nitrate or nitrite salts are particularly preferred myoglobin blooming agents. The food contact portion of the packaging films preferably includes a suitable concentration of the myoglobin blooming agent to induce or preserve a desirable color on the surface layer of a fresh meat product. The packaging films can have any suitable structure, but it is essential that the myoglobin blooming agent be on, or in, or able to migrate to, a food contact portion. The packaging films can be single layer or multilayer, and have a free shrink at 90° C. of at least 10% in at least one direction. Preferably the packaging films have a total free shrink at 90° C. of at least about 30%, more preferably at least 40% or 60% or more. In one aspect, the packaging films comprise a sealant layer comprising a myoglobin blooming agent. The multilayer packaging films can further comprise an oxygen barrier layer. The oxygen barrier layer can comprise any suitable material, such as EVOH or PVDC, and is preferably positioned between the first and second layers. For example, the oxygen barrier layer can be in contact with the sealant layer and/or another layer. In one aspect, a heat-shrinkable food packaging film can have an interior surface and an exterior surface and can include the oxygen barrier layer and a sealant layer comprising a myoglobin blooming agent wherein the film has a free shrink value at 90° C. of at least 10% in at least one of the machine or transverse directions. Advantageously, at least a portion of the film is transparent to permit viewing (after packaging) of at least a portion of a myoglobin containing food product. Preferably, the inventive packaging film has good optical properties such as low haze, high gloss and good transparency. Beneficially, the film may also bear graphics, indicia, printing, or other information.

In another embodiment, packaged food products are provided. The food products are preferably provided in a case-ready configuration. The food product may include a heat shrinkable film having a food contact portion where that film is heat shrunken around a meat product to form a package. The food contact portion includes a suitable concentration of a myoglobin blooming agent to provide a desired coloration of the surface portion of the meat product in contact with the food contact portion. The meat product is preferably a meat product with a measurable water content, such as fresh or cured meat, and most preferably fresh, uncured raw meat. Preferably, the packaged food product includes a meat product having at least about 5% by weight moisture content. Typically, fresh meat may include about 60-80% by weight water, while cured processed meats may include about 40-80% by weight water. Typically fresh meat may have less than 1.0 weight % sodium chloride. Cured processed meat may have 2.0 wt. % to 3.5 wt. % or higher amounts of sodium chloride. Preferably, the packaged food product includes a meat product having a myoglobin concentration of at least about 0.1 mg per gram of meat or higher concentrations up to about 25 mg/g, and optionally at least about 5% moisture content. Examples of suitable fresh meat products include poultry, fish, beef and pork. The package may have any suitable configuration, including vacuum packaging, or trays enclosed in a film of the first embodiment.

In yet another embodiment, methods of packaging a myoglobin-containing food product are provided. Shrink films may be provided in a variety of packaging formats using conventional packaging methods in combination with the above described heat shrinkable film to produce containers and packages such as bags, pouches, casings, vacuum packaging including form shrink packaging, and tray overwraps, etc. and combinations thereof with or without modified atmosphere packaging.

Beneficially, a food product comprising myoglobin, preferably having a moisture content of at least 5 wt. %, may be provided for packaging less than 20 days post-mortem, preferably less than 12 days post-mortem, and more preferably 6 days, 3 days, 2 days, 24 hours or less post-mortem. Preferably, a meat product is contacted by a packaging material comprising a food contact surface having a myoglobin blooming agent, which may preferably be present in an amount of between about 0.001 mg/in$^2$ and about 0.900 mg/in$^2$ or which may be present on the surface in an amount of up to 10 μmoles/inch$^2$ or higher, preferably from about 0.01 to 10 μmoles/inch$^2$. Use of amounts on the surface greater than 10 μmoles/inch$^2$ may provide an undesirable depth of penetration and use of amounts less than 0.01 10 μmoles/inch$^2$ may be insufficient to convert enough myoglobin to cause a visibly perceptible color change, but this will be dependent upon such parameters as choice of the particular type of myoglobin containing food such as poultry versus pork versus beef and also upon variations within a particular type such as dark cutting meat versus light cutting meat. Other parameters such as the amount of available myoglobin also affect the amount of MBA needed to achieve the desired effect. It will be appreciated that greater or lesser amounts may be used depending upon process and other parameters chosen as long as the desired color effect is produced and the actual amount for a particular application and parameters may be determined without undue experimentation. It is expected that the amount most often used will typically fall within the above range. Also preferably, the packaging maintains the food product in a reduced oxygen package environment i.e. having a reduced gaseous oxygen partial pressure. The reduced oxygen package may comprise an oxygen barrier layer having an oxygen transmission rate of less than about 310 cm$^3$/m$^2$/24 hours measured at 0% relative humidity and 23° C. Advantageously, the package is hermetically sealed and minimizes or eliminates oxygen transfer across the film and/or tray thickness.

The compositions, films, packages and methods provided herein are useful to provide packaged fresh, frozen, thawed, processed and/or cured meat products having a desirable surface color, such as red for fresh ground beef.

DETAILED DESCRIPTION

Definitions

Figure 1:
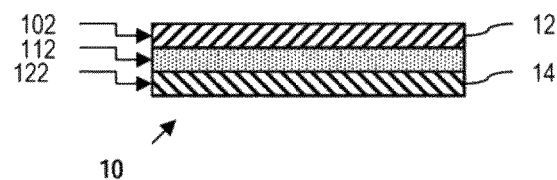
FIG. 1 shows a cross sectional schematic of a first exemplary multilayer film.

In discussing plastic film packaging, various polymer acronyms are used herein and they are listed below. Also, in referring to blends of polymers a colon (:) will be used to indicate that the components to the left and right of the colon are blended. In referring to film structure, a slash "/" will be used to indicate that components to the left and right of the slash are in different layers and the relative position of components in layers may be so indicated by use of the slash to indicate film layer boundaries. Acronyms commonly employed herein include:

EAA—Copolymer of ethylene with acrylic acid
EAO—Copolymers of ethylene with at least one α-olefin
EBA'Copolymer of ethylene with butyl acrylate
EEA—Copolymer of ethylene with ethyl acrylate
EMA—Copolymer of ethylene with methyl acrylate
EMAA—Copolymer of ethylene with methacrylic acid
EVA—Copolymer of ethylene with vinyl acetate
EVOH—A saponified or hydrolyzed copolymer of ethylene and vinyl acetate
PE—Polyethylene (an ethylene homopolymer and/or copolymer of a major portion of ethylene with one or more α-olefins)
PP—Polypropylene homopolymer or copolymer
PET—Poly(ethylene terephthalate)
PVDC—Polyvinylidene chloride (also includes copolymers of vinylidene chloride, especially with vinyl chloride and/or methyl acrylate (MA)), also referred to as saran A "core layer," as used herein, refers to a layer positioned between and in contact with at least two other layers.

An "outer layer," as used herein, is a relative term and need not be a surface layer.

The term "exterior layer" refers to a layer comprising the outermost surface of a film or product.

The term "interior layer" refers to a layer comprising the innermost surface of a film or product. For example, an interior layer forms the interior surface of an enclosed package. The interior layer can be the food-contact layer and/or the sealant layer.

As used herein, the term "barrier," and the phrase "barrier layer," as applied to films and/or film layers, are used with reference to the ability of a film or film layer to serve as a barrier to one or more gases or moisture.

The term "nanocomposite" shall mean a mixture that includes a polymer, or copolymer having dispersed therein a plurality of individual platelets obtained from an exfoliated modified clay and having oxygen barrier properties.

The term "adhesive layer," or "tie layer," refers to a layer or material placed on one or more layers to promote the adhesion of that layer to another surface. Preferably, adhesive layers are positioned between two layers of a multilayer film to maintain the two layers in position relative to each other and prevent undesirable delamination. In some embodiments a peelable tie layer may be used which is designed to have either cohesive failure or delamination from one or both adjacent layers upon application of a suitable manual force to provide an opening feature for a package made from the film. Unless otherwise indicated, an adhesive layer can have any suitable composition that provides a desired level of adhesion with the one or more surfaces in contact with the adhesive layer material. Optionally, an adhesive layer placed between a first layer and a second layer in a multilayer film may comprise components of both the first layer and the second layer to promote simultaneous adhesion of the adhesive layer to both the first layer and the second layer to opposite sides of the adhesive layer.

As used herein, the phrases "seal layer," "sealing layer," "heat seal layer," and "sealant layer," refer to a film layer, or layers, involved in the sealing of the film: to itself; to another film layer of the same film or another film; and/or to another article which is not a film e.g. a tray. In general, the sealant layer is a surface layer i.e. an exterior or an interior layer of any suitable thickness, that provides for the sealing of the film to itself or another layer. With respect to packages having only fin-type seals, as opposed to lap-type seals, the phrase "sealant layer" generally refers to the interior surface film layer of a package. The inside layer frequently can also serve as a food contact layer in the packaging of foods.

"Polyolefin" is used herein broadly to include polymers such as polyethylene, ethylene-alpha olefin copolymers (EAO), polypropylene, polybutene, ethylene copolymers having a majority amount by weight of ethylene polymerized with a lesser amount of a comonomer such as vinyl acetate, and other polymeric resins falling in the "olefin" family classification. Polyolefins may be made by a variety of processes well known in the art including batch and continuous processes using single, staged or sequential reactors, slurry, solution and fluidized bed processes and one or more catalysts including for example, heterogeneous and homogeneous systems and Ziegler, Phillips, metallocene, single site and constrained geometry catalysts to produce polymers having different combinations of properties. Such polymers may be highly branched or substantially linear and the branching, dispersity and average molecular weight and may vary depending upon the parameters and processes chosen for their manufacture in accordance with the teachings of the polymer arts.

"Polyethylene" is the name for a polymer whose basic structure is characterized by the chain $-(CH_2-CH_2-)_n$. Polyethylene homopolymer is generally described as being a solid which has a partially amorphous phase and partially crystalline phase with a density of between 0.915 to 0.970 g/cm$^3$. The relative crystallinity of polyethylene is known to affect its physical properties. The amorphous phase imparts flexibility and high impact strength while the crystalline phase imparts a high softening temperature and rigidity.

Unsubstituted polyethylene is generally referred to as high density homopolymer and has a crystallinity of 70 to 90 percent with a density between about 0.96 to 0.97 g/cm$^3$. Most commercially utilized polyethylenes are not unsubstituted homopolymer but instead have $C_2$-$C_8$ alkyl groups attached to the basic chain. These substituted polyethylenes are also known as branched chain polyethylenes. Also, commercially available polyethylenes frequently include other substituent groups produced by copolymerization. Branching with alkyl groups generally reduces crystallinity, density and melting point. The density of polyethylene is recognized as being closely connected to the crystallinity. The physical properties of commercially available polyethylenes are also affected by average molecular weight and molecular weight distribution, branching length and type of substituents.

People skilled in the art generally refer to several broad categories of polymers and copolymers as "polyethylene." Placement of a particular polymer into one of these categories of "polyethylene" is frequently based upon the density of the "polyethylene" and often by additional reference to the process by which it was made since the process often determines the degree of branching, crystallinity and density. In general, the nomenclature used is nonspecific to a compound but refers instead to a range of compositions. This range often includes both homopolymers and copolymers.

For example, "high density" polyethylene (HDPE) is ordinarily used in the art to refer to both (a) homopolymers of densities between about 0.960 to 0.970 g/cm$^3$ and (b) copolymers of ethylene and an alpha-olefin (usually 1-butene or 1-hexene) which have densities between 0.940 and 0.958 g/cm$^3$. HDPE includes polymers made with Ziegler or Phillips type catalysts and is also said to include high molecular weight "polyethylenes." In contrast to HDPE, whose polymer chain has some branching, are "ultra high molecular weight polyethylenes" which are essentially unbranched specialty polymers having a much higher molecular weight than the high molecular weight HDPE.

Hereinafter, the term "polyethylene" will be used (unless indicated otherwise) to refer to ethylene homopolymers as well as copolymers of ethylene with alpha-olefins and the term will be used without regard to the presence or absence of substituent branch groups.

Another broad grouping of polyethylene is "high pressure, low density polyethylene" (LDPE). LDPE is used to denominate branched homopolymers having densities between 0.915 and 0.930 g/cm$^3$. LDPEs typically contain long branches off the main chain (often termed "backbone") with alkyl substituents of 2 to 8 carbon atoms.

Linear Low Density Polyethylene (LLDPE) are copolymers of ethylene with alpha-olefins having densities from 0.915 to 0.940 g/cm$^3$. The alpha-olefin utilized is usually 1-butene, 1-hexene, or 1-octene and Ziegler-type catalysts are usually employed (although Phillips catalysts are also used to produce LLDPE having densities at the higher end of the range, and metallocene and other types of catalysts are also employed to produce other well known variations of LLDPEs).

Ethylene α-olefin copolymers are copolymers having an ethylene as a major component copolymerized with one or more alpha olefins such as octene-1, hexene-1, or butene-1 as a minor component. EAOs include polymers known as LLDPE, VLDPE, ULDPE, and plastomers and may be made using a variety of processes and catalysts including metallocene, single-site and constrained geometry catalysts as well as Ziegler-Natta and Phillips catalysts.

Very Low Density Polyethylene (VLDPE) which is also called "Ultra Low Density Polyethylene" (ULDPE) comprise copolymers of ethylene with alpha-olefins, usually 1-butene, 1-hexene or 1-octene and are recognized by those skilled in the art as having a high degree of linearity of structure with short branching rather than the long side branches characteristic of LDPE. However, VLDPEs have lower densities than LLDPEs. The densities of VLDPEs are recognized by those skilled in the art to range between 0.860 and 0.915 g/cm$^3$. A process for making VLDPEs is described in European Patent Document publication number 120,503 whose text and drawing are hereby incorporated by reference into the present document. Sometimes VLDPEs having a density less than 0.900 g/cm$^3$ are referred to as "plastomers".

Polyethylenes may be used alone, in blends and/or with copolymers in both monolayer and multilayer films for packaging applications for such food products as poultry, fresh red meat and processed meat.

As used herein, the term "modified" refers to a chemical derivative e.g. one having any form of anhydride functionality, such as anhydride of maleic acid, crotonic acid, citraconic acid, itaconic acid, fumaric acid, etc., whether grafted onto a polymer, copolymerized with a polymer, or otherwise functionally associated with one or more polymers, and is also inclusive of derivatives of such functionalities, such as acids, esters, and metal salts derived therefrom. Another example of a common modification is acrylate modified polyolefins.

As used herein, terms identifying polymers, such as e.g. "polyamide" or "polypropylene," are inclusive of not only polymers comprising repeating units derived from monomers known to polymerize to form a polymer of the named type, but are also inclusive of comonomers, as well as both unmodified and modified polymers made by e.g. derivitization of a polymer after its polymerization to add functional groups or moieties along the polymeric chain. Furthermore, terms identifying polymers are also inclusive of "blends" of such polymers. Thus, the terms "polyamide polymer" and "nylon polymer" may refer to a polyamide-containing homopolymer, a polyamide-containing copolymer or mixtures thereof.

The term "polyamide" means a high molecular weight polymer having amide linkages ($-CONH-$)$_n$ which occur along the molecular chain, and includes "nylon" resins which are well known polymers having a multitude of uses including utility as packaging films, bags, and casings. See, e.g. *Modern Plastics Encyclopedia,* 88 Vol. 64, No. 10A, pp 34-37 and 554-555 (McGraw-Hill, Inc., 1987) which is hereby incorporated by reference. Polyamides are preferably selected from nylon compounds approved for use in producing articles intended for use in processing, handling, and packaging food.

The term "nylon" as used herein it refers more specifically to synthetic polyamides, either aliphatic or aromatic, either in crystalline, semi-crystalline, or amorphous form characterized by the presence of the amide group —CONH. It is intended to refer to both polyamides and co-polyamides.

Thus the terms "polyamide" or "nylon" encompass both polymers comprising repeating units derived from monomers, such as caprolactam, which polymerize to form a polyamide, as well as copolymers derived from the copolymerization of caprolactam with a comonomer which when polymerized alone does not result in the formation of a polyamide. Preferably, polymers are selected from compositions approved as safe for producing articles intended for use in processing, handling and packaging of food, such as nylon resins approved by the U.S. Food and Drug Administration provided at 21 CFR §177.1500 ("Nylon resins"), which is incorporated herein by reference. Examples of these nylon polymeric resins for use in food packaging and processing include: nylon 66, nylon 610, nylon 66/610, nylon 6/66, nylon 11, nylon 6, nylon 66T, nylon 612, nylon 12, nylon 6/12, nylon 6/69, nylon 46, nylon 6-3-T, nylon MXD-6, nylon MXDI, nylon 12T and nylon 6I/6T disclosed at 21 CFR §177.1500. Examples of such polyamides include nylon homopolymers and copolymers such as those selected form the group consisting of nylon 4,6 (poly(tetramethylene adipamide)), nylon 6 (polycaprolactam), nylon 6,6 (poly(hexamethylene adipamide)), nylon 6,9 (poly(hexamethylene nonanediamide)), nylon 6,10 (poly(hexamethylene sebacamide)), nylon 6,12 (poly(hexamethylene dodecanediamide)), nylon 6/12 (poly(caprolactam-co-dodecanediamide)), nylon 6,6/6 (poly(hexamethylene adipamide-co-caprolactam)), nylon 66/610 (e.g., manufactured by the condensation of mixtures of nylon 66 salts and nylon 610 salts), nylon 6/69 resins (e.g., manufactured by the condensation of epsilon-caprolactam, hexamethylenediamine and azelaic acid), nylon 11 (polyundecanolactam), nylon 12 (polylauryllactam) and copolymers or mixtures thereof.

In use of the term "amorphous nylon copolymer," the term "amorphous" as used herein denotes an absence of a regular three-dimensional arrangement of molecules or subunits of molecules extending over distances which are large relative to atomic dimensions. However, regularity of structure may exist on a local scale. See, "Amorphous Polymers," Encyclopedia of Polymer Science and Engineering, 2nd Ed., pp. 789-842 (J. Wiley & Sons, Inc. 1985). In particular, the term "amorphous nylon copolymer" refers to a material recognized by one skilled in the art of differential scanning calorimetry (DSC) as having no measurable melting point (less than 0.5 cal/g) or no heat of fusion as measured by DSC using ASTM 3417-83. The amorphous nylon copolymer may be manufactured by the condensation of hexamethylenediamine, terephthalic acid, and isophthalic acid according to known processes. Amorphous nylons also include those amorphous nylons prepared from condensation polymerization reactions of diamines with dicarboxylic acids. For example, an aliphatic diamine is combined with an aromatic dicarboxylic acid, or an aromatic diamine is combined with an aliphatic dicarboxylic acid to give suitable amorphous nylons.

As used herein, "EVOH" refers to ethylene vinyl alcohol copolymer. EVOH is otherwise known as saponified or hydrolyzed ethylene vinyl acetate copolymer, and refers to a vinyl alcohol copolymer having an ethylene comonomer. EVOH is prepared by the hydrolysis (or saponification) of an ethylene-vinyl acetate copolymer. The degree of hydrolysis is preferably from about 50 to 100 mole percent, more preferably, from about 85 to 100 mole percent, and most preferably at least 97%. It is well known that to be a highly effective oxygen barrier, the hydrolysis-saponification must be nearly complete, i.e. to the extent of at least 97%. EVOH is commercially available in resin form with various percentages of ethylene and there is a direct relationship between ethylene content and melting point. For example, EVOH having a melting point of about 175° C. or lower is characteristic of EVOH materials having an ethylene content of about 38 mole % or higher. EVOH having an ethylene content of 38 mole % has a melting point of about 175° C. With increasing ethylene content the melting point is lowered. Also, EVOH polymers having increasing mole percentages of ethylene have greater gas permeabilities. A melting point of about 158° C. corresponds to an ethylene content of 48 mole %. EVOH copolymers having lower or higher ethylene contents may also be employed. It is expected that processability and orientation would be facilitated at higher contents; however, gas permeabilities, particularly with respect to oxygen, may become undesirably high for certain packaging applications which are sensitive to microbial growth in the presence of oxygen. Conversely lower contents may have lower gas permeabilities, but processability and orientation may be more difficult.

As used herein, the term "polyester" refers to synthetic homopolymers and copolymers having ester linkages between monomer units which may be formed by condensation polymerization methods. Polymers of this type are preferable aromatic polyesters and more preferable, homopolymers and copolymers of poly(ethylene terephthalate), poly (ethylene isophthalate), poly(butylene terephthalate), poly (ethylene naphthalate) and blends thereof. Suitable aromatic polyesters may have an intrinsic viscosity between 0.60 to 1.0, preferably between 0.60 to 0.80.

"Reduced oxygen atmosphere" when referring to a packaged meat product refers to a reduction in the partial pressure of oxygen in contact with the packaged meat product, in comparison with the partial pressure of oxygen in the Earth's atmosphere at standard temperature and pressure at sea level. Reduced oxygen atmosphere packages may include modified atmosphere packages where the oxygen partial pressure is less than that of the Earth's atmosphere at standard temperature and pressure at sea level, or vacuum packages, containing minimal gas pressure in contact with the packaged meat.

"Meat" or "meat product" refers to any myoglobin or hemoglobin containing tissue from livestock such as beef, pork, veal, lamb, mutton, chicken or turkey; game such as venison, quail, and duck; and fish, fishery or seafood products. The meat can be in a variety of forms including primals, subprimals, and retail cuts as well as ground, comminuted or mixed. The meat or meat product is preferably fresh, raw, uncooked meat, but may also be frozen, or thawed. It is further believed that meat may be subjected to other irradiative, biological, chemical or physical treatments. The suitability of any particular such treatment may be determined without undue experimentation in view of the present disclosure. As long as the myoglobin blooming agent containing film is effective to promote, develop, enhance or maintain a desirable color it may be advantageously employed to such end. Preferably the meat is less than 20 days post mortem. More preferably the meat is less than 12 days or even 6 days or less post mortem.

Primal cuts of meat are also termed wholesale cuts and both terms refer to large sections of a carcass that are usually sold and/or shipped to butchers who further subdivide the primal into subprimals and individual retail cuts for sale to consumers. Examples of primal cuts of beef are: round; rump; loin end; flank; short loin; plate; rib; brisket; shank; and chuck. Examples of pork primals include: loin; leg; shoulder; and belly.

Subprimals are intermediate in size and may be divided further into retail cuts or are sometimes sold as retail cuts. Beef subprimals include: arm; blade; ribs; beef plate; top round; bottom round; ribs; top butt; bottom butt; tenderloin; and top loin. Pork subprimals include: butt shoulder; picnic shoulder; center cut; sirloin; butt end; shank end; side pork and side rib.

Retail cuts of meat are consumer cuts made by dividing wholesale cuts into smaller pieces. Examples of retail cuts of beef include: steaks such as round, top round, cubed, sirloin, t-bone, porterhouse, filet mignon, rib eye, rib, skirt, flank, and tip; roasts such as blade, pot, and chuck; corned brisket; fresh brisket; stew beef; short ribs; kabobs; eye of round; rolled rump; shank cross cuts; steak rolls; ground beef; and beef patties. Examples of retail cuts of pork include: arm roasts and steaks; spareribs; bacon; salt pork; ham; ham steaks; ham slices; pork tenderloin; chops; cutlets; fat back; sausage; links; and ground pork.

"Fresh meat" means meat that is uncooked, uncured, unsmoked and unmarinated. "Fresh meat" includes post mortem meat that has been physically divided, for example, by cutting, grinding or mixing. There is no added salt in fresh meat that has not been enhanced. Naturally occurring sodium typically is less than 50 mg/100 g of meat and accounts for a salt content of less than about 0.15, preferably less than 0.128 wt. %. Values of sodium are in a data base for nutritional composition of meat called the "National Nutrient Data Bank", and the data is published in Agriculture Handbook No. 8, "Composition of Foods—Raw, Processed, Prepared" referred to in the industry as "Handbook 8" both of which are hereby incorporated by reference.

"Enhanced meat" means meat that has added water mixed with other ingredients such as sodium chloride, phosphates, antioxidants, and flavoring e.g. to make meat moist, more tender and to help enhance shelf-life. Fresh beef, pork or poultry after being "enhanced" would typically contain 0.3-0.6 wt. % salt (sodium chloride).

"Processed meat" means meat that has been changed by heat and chemical processes, e.g., by cooking or curing. Cooked ham, hot dogs, and lunch meat are examples of cured processed meat.

"Uncured processed meats" are processed meats that do not contain nitrites or nitrates. Uncured processed meats would typically contain greater than 1.0% by weight, typically 1.2-2.0 wt. %, sodium chloride (salt). Cooked roast beef and bratwurst are examples of uncured processed meat.

"Cured meat" means meat that is preserved through direct addition of nitrite (or nitrate which is converted to nitrite) e.g. having at least 50 ppm sodium nitrite and at least 1% by wt. added salt, i.e. sodium chloride, for the purpose of preservation by retarding bacterial growth. Nitrites, nitrates or blends thereof are commonly present with sodium chloride in curing compositions. "Uncured meat" does not contain added nitrite or nitrate. Wet cured meats are soaked in salt brine. Dry cured meats have salt applied to the surface. Injection cured meats have the curing salts (cure) applied by needle injection into the meat.

Cured processed meats often have 2-3.5 wt. % salt. A brine content of 3.5-4.0 wt. % (2.6-3.0% on a weight basis in treated meat) as the level of sodium chloride salt (potassium chloride may be substituted for some or all of the NaCl) is needed in processed meat to adequately slow down bacterial growth to permit 60-90 day shelf life, although other means of preservation may also be employed to maintain shelf life at reduced salt levels. According to Pegg, R. B. and F. Shahidi, 2000. Nitrite Curing of Meat. Food & Nutrition Press, Inc. Trumbull, Conn. 06611 cured meats may have typical salt levels of 1.2-1.8 wt. % in bacon, 2-3 wt. % in hams, 1-2 wt. % in sausages and 2-4 wt. % in jerkies. It is believed that fresh meat such as beef, pork and poultry has no nitrite or nitrate naturally occurring or added. The United States Department of Agriculture (USDA) permits ingoing nitrite and nitrate for cured and processed meat at a level up to a maximum of 625 ppm sodium nitrite or 2,187 ppm sodium nitrate in dry cured products. In other applications levels have different limits e.g. in typical cooked whole muscle meat products the limit as sodium nitrite is 156 ppm and in comminuted meats, 200 ppm. The maximum nitrite usage level in hot dogs or bologna is typically 156 ppm, while that for bacon is 120 ppm. Sodium ascorbate (or similar compounds) may be present in these cures.

In Europe it is believed that the minimum level of salt and nitrite required by law for curing is 1.0 wt. % and 50 ppm respectively. The USDA has stated: "As a matter of policy, the Agency requires a minimum of 120 ppm of ingoing nitrite in all cured "Keep Refrigerated" products, unless the establishment can demonstrate that safety is assured by some other preservation process such as thermal processing, pH or moisture control. This 120 ppm policy for ingoing nitrite is based on safety data reviewed when the bacon standard was developed." (See, "Processing Inspectors' Calculations Handbook", Chapter 3, p. 12, revised 1995). The Handbook also states: "There is no regulatory minimum ingoing nitrite level however 40 ppm nitrite is useful in that it has some preservative effect. This amount has also been show to be sufficient for color-fixing purposes and to achieve the expected cured meat or poultry appearance."

The meat product can be any meat suitable for human consumption that contains a myoglobin like molecule. References to total myoglobin in a meat product refer to the amount of the myoglobin like molecules that are physiologically present in the meat tissue prior to harvesting for human consumption. Specific meat products contain a level of myoglobin sufficient to provide its characteristic color. Examples of suitable fresh meat cuts include beef, veal, pork, poultry, mutton, and lamb. The concentration of myoglobin varies in these different types of meat products. For example, beef typically contains about 3-20 mg of myoglobin per gram of meat, pork contains about 1-5 mg myoglobin per gram of meat, chicken contains less than about 1 mg myoglobin per gram of meat. Thus, the concentration of total myoglobin compounds in the above described meat products is typically between about 0.5 mg and 25 mg of myoglobin compounds per gram of the meat product.

In fresh meat (postmortem muscle tissue), oxygen can continually associate and disassociate from the heme complex of the myoglobin molecule. It is the relative abundance of three forms of the muscle pigment that determines the visual color of fresh meat. They include purple deoxymyoglobin (reduced myoglobin), red oxymyoglobin (oxygenated myoglobin); and brown metmyoglobin (oxidized myoglobin). The deoxymyoglobin form typically predominates immediately after the animal is slaughtered. Thus, freshly cut meat can have a purple color. This purple color can persist for a long time if the pigment is not exposed to oxygen. Cutting or grinding exposes the pigment to oxygen in the atmosphere, and the purple color can quickly convert to either bright red (oxymyoglobin) or brown (metmyoglobin). Thus, although deoxymyoglobin is technically indicative of fresher meat, it is the red or "bloomed" meat color that consumers use as their primary criterion for perceiving freshness. It is believed without wishing to be bound by the belief that the preferred red color of fresh meat occurs when at least 50% of the deoxymyoglobin molecules are oxygenated to the oxymyoglobin state. Changes in the relative percentage of each of these forms can continue to occur as fresh meat is exposed to oxygen for longer periods of time. The immediate conversion of the purple color to the desirable bright red or undesirable brown can depend on the partial pressure of oxygen at the surface. The purple color is favored at the very low oxygen level, and can dominate at oxygen levels of 0-0.2% by volume. The brown color is favored when the partial pressure of oxygen is only slightly higher (0.2% to 5.0%). Consumer discrimination typically begins when the relative amount of metmyoglobin is 20%. A distinctly brown color is evident at 40% metmyoglobin, which typically renders the meat unsaleable even though it remains nutritious and healthy for consumption.

Certain biochemical reactions that occur in muscle tissue after death can also affect fresh meat color, such as the presence of active glycolytic enzymes that convert oxygen to carbon dioxide. Reducing coenzymes called metmyoglobin reductases present in meat convert metmyoglobin back to deoxymyoglobin, and their activity is called "MRA" which is an abbreviation for metmyoglobin reducing activity. MRA can be described as the ability of muscle to reduce metmyoglobin back to its natural deoxymyoglobin state. MRA is lost when the oxidizable substrates are depleted or when heat or acid denatures the enzymes. When the enzymes lose their activity or are denatured, the iron of the heme pigment automatically oxidizes to the metmyoglobin form, and the brown color stabilizes and dominates. MRA persists for a period of time after death depending on the amount of exposure of the meat tissue to oxygen. During this time oxygen is continually consumed by the meat tissue. The oxygen consumption rate is referred to as "OCR". When meat that has a high OCR is exposed to oxygen, the oxygen tension is reduced so rapidly that the metmyoglobin is favored below the viewing surface. If it is close to the viewing surface, the perceived color of the meat is affected. The MRA is important to minimize this layer of metmyoglobin that forms between the bloomed surface and purple interior. As the MRA wears out, the brown metmyoglobin layer thickens and migrates toward the surface, thus terminating display life. When the MRA is high, the metmyoglobin layer is thin and sometimes not visible to the naked eye.

MRA and OCR relate to determining the types of packaging best suited for retail sale in order to prolong the desirable appearance of meat as long as possible. Hermetically sealed packages with films that are a barrier to oxygen will cause a low oxygen tension on the meat surface. Thus, metmyoglobin formation occurs and the viewing surface changes to an undesirable brown color. However, if the OCR is high enough to keep ahead of the oxygen that migrates across the packaging film, and the MRA is good enough to reduce metmyoglobin that forms on the surface, then native deoxymyoglobin replaces metmyoglobin. After a period of time, the perceived color changes from brown to purple. Both of these colors are unacceptable to the consumer. For this reason, vacuum packaging by itself has historically been an unacceptable format for case ready fresh meat although it is used to ship subprimal and other large cuts of meat from the slaughterhouse to retail butchers for further processing and re-packaging. On the other hand, vacuum packaging is the format of choice for cooked and cured processed meats where the myoglobin pigment is denatured by heat. Heat from cooking causes the globin portion of the nitrosylated myoglobin molecule to denature and separate from the heme portion. It is the nitrosylated heme complex that gives cured and processed meats their characteristic color. When oxygen is eliminated from a cured processed meat package, the product's color and flavor can deteriorate slower than when oxygen is present. In the present invention oxygen must be removed from the environment of the meat before the preferred color can develop. A certain amount of oxygen penetrates the meat after slaughter and fabrication. This oxygen is eliminated by the OCR/MRA activities. Similarly those activities facilitate the dominance of the deoxymyoglobin form of the myoglobin molecule. It is believed but not wishing to be bound by the belief that the OCR/MRA activities also facilitate the reduction of nitrite to nitric oxide. The formation of deoxymyoglobin and nitric oxide allows for the bloomed color development. Oxygen itself is a blooming agent because it causes the formation of oxymyoglobin as described earlier herein. However, oxygen interferes with the reactions that form deoxymyoglobin and nitric oxide. Therefore, it interferes with the bloomed color development in the presence of nitrite. Thus, it is a preferred aspect of the present invention that an oxygen barrier layer is selected and configured to protect the meat surface from the ingress of atmospheric oxygen during the formation of the desired bloomed meat color.

Myoglobin Blooming Agents

A "myoglobin blooming agent" refers to any agent (or precursor thereof) that binds to or interacts with any myoglobin-containing structure (including but not limited to deoxymyoglobin, oxymyoglobin, metmyoglobin, carboxymyoglobin, and nitric oxide myoglobin) present in a fresh meat product to produce or preserve a desired color, such as a red color indicative of fresh meat. The myoglobin blooming agent may also interact or cause an interaction with hemoglobin present in a meat product so as to produce, maintain or enhance i.e. "fix" a desired color. Thus, the myoglobin blooming agent is not a color additive, but it acts as a color fixative. In one preferred embodiment, the myoglobin blooming agent is a "nitric oxide donating compound" ("NO donor") that provides a nitric oxide (NO) molecule that binds to the myoglobin present in a meat product so as to maintain or promote a reddening or blooming or other favorable coloration of the meat product. A nitric oxide donating compound releases nitric oxide or is a precursor e.g. nitrate which acts as an intermediate leading to the formation of nitric oxide which binds to a myoglobin molecule in a meat product. In a first aspect, the myoglobin blooming agent is a nitrate ($MNO_3$) or nitrite ($MNO_2$) salt, where suitable metal counter ion ($M^+$) can be selected from the group consisting of: alkali metals (e.g. sodium, potassium), alkaline earth metals (e.g. calcium), transition metal, ammonium and or protonated primary, secondary, or tertiary amines or quaternary amines. In a second aspect, the myoglobin blooming agent comprises a Fremy's salt [$NO(SO_3Na)_2$ and $NO(SO_3K)_2$]. Other suitable nitric oxide donating agents are disclosed in U.S. Pat. No. 6,706,274 to Herrmann et al. (filed Jan. 18, 2001), U.S. Pat. No. 5,994,444 to Trescony et al. (filed Oct. 16, 1997), and U.S. Pat. No. 6,939,569 to Green et al. (filed Jun. 18, 1999), as well as published U.S. Patent Application No. US2005/

0106380 by Gray et al. (filed Nov. 13, 2003). The myoglobin blooming agent may be a salt, particularly a nitrite or nitrate salt. Sodium nitrate or sodium nitrite or blends thereof may typically be used. Potassium nitrate or potassium nitrite may also be used. Additionally suitable compounds may include a nitrogen containing agent that promotes the release or formation of NO such as nitrite reductase, nitrate reductase or nitrosothiol reductase catalytic agents, including the materials described in WIPO Publication No. WO 02/056904 by Meyerhoff et al. (filed Jan. 16, 2002), which is incorporated herein by reference. It is expected that these agents and compounds would be suitable myoglobin blooming agents. Other suitable agents may include sulfur containing compounds that similarly bind or act as precursors or intermediates to agents that fix a desirable color by binding to myoglobin.

Myoglobin blooming agents and solutions or dispersions thereof may be colorless such as sodium nitrate, or e.g. such as sodium nitrite may have an intrinsic pale color (i.e. may not be totally colorless), but this color does not typically have sufficient intensity itself to act as a significant colorant or color additive. However, this does not preclude either the use of colored myoglobin blooming agents which impart an intrinsic color or the combination of a myoglobin blooming agent in combination with one or more natural and/or artificial colorants, pigments, dyes and/or flavorants such as annatto, bixin, norbixin, beet powder, caramel, carmine, cochineal, turmeric, paprika, liquid smoke, one or more FD&C colorants, etc.

The myoglobin blooming agent is believed to cause an interaction with myoglobin in meat products, thereby maintaining, promoting or enhancing a desirable meat color. Myoglobin includes a non-protein portion called heme and a protein portion called globin. The heme portion includes an iron atom in a planar ring. The globin portion can provide a three-dimensional structure that surrounds the heme group and stabilizes the molecule. The heme group provides an open binding site that can bind certain ligands having the proper shape and electron configuration to bond to the iron atom. When a ligand enters and binds to the heme pocket, the electron configuration of the ligand can change the shape of the globin portion of the molecule in a manner that affects light absorption characteristics of the heme group. Therefore, the presence or absence of a ligand such as oxygen in the heme pocket, and the ligand itself can result in visible color changes of myoglobin.

When there is no ligand in the heme pocket, myoglobin is called deoxymyoglobin, which has a purple color (which is sometimes characterized as a deep red, dark red, reddish blue or bluish red). Molecular oxygen, $O_2$ ("oxygen") readily acts as a ligand that binds to the heme group, permitting biological transport of oxygen from the blood stream to the mitochondria within cells. When oxygen binds to the heme pocket, purple deoxymyoglobin becomes oxymyoglobin, characterized by a red color. Upon dissociation of the oxygen ligand from oxymyoglobin, the iron atom is oxidized leaving the iron in the ferric state. As the chemical state of iron can change from ferrous ($Fe^{2+}$) to ferric ($Fe^{3+}$), the three-dimensional structure of the globin part can change in a manner that allows water molecules to bind to the heme pocket. Binding of a water molecule in the ferric iron containing heme pocket affects light absorption of the heme pocket. The oxidized form of myoglobin with a water molecule in the heme group is referred to as metmyoglobin and its color is brown. The oxidation of the iron atom is believed to result in a brown color. Heme ligands other than oxygen or water may also affect meat color. For example, the presence of cyanide or fluorine can cause an undesirable brown meat color, and the presence of carbon monoxide (CO) may cause a desirable bright red color similar to oxygen. Although it has been suggested that nitric oxide (NO) can cause a dull red (or stable pink in the case of cured meat which also contains sodium chloride, it has been discovered that in the absence of oxygen NO may produce a desired bright red color similar to that caused by oxygen in uncooked meat, especially in fresh, raw, unprocessed or uncured meat. It has been discovered that the development of this desired bright red color may take many hours and typically may take from 1 to 5 days and that initially the meat color in a vacuum package having an oxygen barrier may turn to an undesirable brown until the unexpected transformation to the desired red takes place.

Other variables that affect the stability of the globin portion also affect the affinity of the heme group for oxygen and the tendency of the chemical state of the iron atom to become oxidized. Acidity and high temperature, such as that associated with cooking, can denature the globin part thus leading to instability of the heme group. In the absence of stabilizing ligands the oxidation of the heme iron is automatic when the globin is denatured.

Heat-Shrinkable Food Packaging Films

In the present invention, heat shrinkable, oxygen barrier, food packaging films having a food contact surface comprising a myoglobin blooming agent are provided. A "food contact surface" refers to the portion of a packaging material that is designed to contact a packaged meat product surface. Preferably, the food packaging film includes a food contact surface comprising a myoglobin blooming agent in an amount effective to promote or maintain a desirable color after contact with a meat product. The myoglobin blooming agent (MBA) preferably will contact the meat surface in an amount sufficient to produce a desired red color which preferably does not penetrate to an undesirable depth of the food thickness under reduced oxygen conditions (this color may take awhile to develop e.g. 1 to 5 days). Beneficially the MBA may be present on the film food contact surface (or on the myoglobin food surface) in an amount of from about 0.05 to 3 to 5 to 10 μmoles/in$^2$ and in increments of 0.1 μmole thereof. Greater or lesser amounts of MBA may be used and the color intensity may thereby be varied depending upon the relative presence or absence of myoglobin.

Thus, the food contact surface of the heat shrinkable film preferably contains a myoglobin blooming agent in a concentration high enough to produce and/or maintain a desired surface coloration of a fresh meat product, but low enough to prevent undesirable extension of the color into the body of the meat product. Preferably, the myoglobin blooming agent is present on a food contact surface in a concentration that is sufficient upon contact with a meat surface to convert at least 50% of the targeted myoglobin molecules to a desired ligand binding state. The available amount or concentration of myoglobin blooming agent is preferably selected to bind ligands producing desirable coloration of the meat to the myoglobin molecules in the outermost ¼-inch, or ⅙, ⅛, ¹⁄₁₀, ¹⁄₁₂, ¹⁄₁₆ or /1;20-inch or less of the meat product, although deeper penetrations may be accomplished if desired. For example, a nitric oxide donating myoglobin blooming agent is desirably present in a concentration sufficient to convert at least 50% of the myoglobin molecules on the contacting meat surface to nitric oxide myoglobin. The myoglobin blooming agent may be coated on a monolayer film or on the interior layer of a multilayer film or it may be incorporated therein.

The myoglobin blooming agent is preferably evenly or uniformly distributed on the surface of the food contact surface The minimum amount required to cause the desired coloration depends on the concentration of myoglobin present in the food product. For example, beef products containing 10 mg/gm of myoglobin may require 10 times more myoglobin blooming agent than poultry products containing 1 mg/gm of myoglobin. Also, if the desired depth of penetration is 0.25 inches, then in order to affect all of the myoglobin molecules (molecular weight of myoglobin is about 17,000 g/mole) in 1 square inch of beef to a depth of 0.25 inches, there would have to be at least 2.4 umoles of the myoglobin blooming agent available for transfer via the surface of 1 square inch of film (one square inch of beef to a depth of about 0.25 inches equals about 4.1 grams of meat (specific gravity of 1 gm/cc)). Sodium nitrite as a preferred myoglobin blooming agent has a molecular weight of 69 g/mole. Thus 2.4 umoles of $NaNO_2$ weighs 0.166 mg and the total amount of myoglobin in 4.1 grams of meat containing 10 mg/gm is 41 mg. Beef meat typically contains myoglobin at a level of 3-10 mg/gm. The preferred amount of myoglobin blooming agent that would be present on the film beef is 0.72-2.4 umoles/in$^2$. Similarly pork contains myoglobin at a level of 1-3 mg/gm. A packaging film for this application would provide 0.24-0.72 umoles/in$^2$. Poultry having less than 1 mg/gm of myoglobin would preferably use a film providing less than 0.24 umoles/in$^2$ e.g. 0.12 umoles/in$^2$. A film using sodium nitrite (MW=69 g/mole) as a myoglobin blooming agent would preferably provide 0.050-0.166 mg/in$^2$ for beef meat products; 0.017-0.050 mg/in$^2$ for pork meat products; and less than 0.017 mg/in$^2$ for poultry meat products. A film providing 0.17 mg/in$^2$ would be suitable for a variety of types of fresh meat.

A higher amount of sodium nitrite may be preferred for darker colored muscles that may contain higher levels of myoglobin. When the myoglobin blooming agent is incorporated into the polymer matrix that comprises the food contact layer of a monolayer or multilayer packaging film only a portion of it is able to effectively migrate from the film surface into the products surface. Film inclusion levels of up to 20 times or higher of the amount required for effective color fixing is anticipated.

Thus, the amount of myoglobin blooming agent per unit area of the food contact surface can be selected to provide a desired food coloration of a packaged fresh meat product surface. For example, the food contact layer can include about 0.005 to about 0.900 mg/in$^2$ of a myoglobin blooming agent such as sodium nitrite, preferably about 0.010 to about 0.400 mg/in$^2$ and most preferably about 0.100 to about 0.300 mg/in$^2$. For beef products, a food contact layer may include e.g. about 0.200 to about 0.250 mg/in$^2$ e.g. of a sodium nitrite myoglobin blooming agent, while lower concentrations e.g. of about 0.100 to about 0.150 mg/in$^2$ may be used for pork products.

A uniform dispersion or coating having particle size of 35 micrometers ($\mu$) or less, preferably 10$\mu$ or less (fineness of grind of 4 gu or less) is desirable. Although larger particle sizes may also be used, the film prior to use is less aesthetically pleasing. If particle size is too large, an initial spotty appearance may result although results tend to even out and become more uniform over time and such desirable color uniformity (i.e. lack of spottiness or blotches) is often present upon color transformation from brown to red. Advantageously, the myoglobin blooming agent may be applied in a manner to wet out the surface of the food contact surface layer of the film using film forming agents, surfactants, binding agents and other compounds for the purpose. For example, the myoglobin blooming agent according to the present invention may be sprayed on a food contact surface of the film. Tubular films and casings also may be coated by other means (including the well known methods of dipping and slugging). Typical myoglobin blooming agents do not easily pass through the film wall and therefore it is preferable to slug the myoglobin blooming agent inside the tube and/or apply the myoglobin blooming agent to the inner surface of the tube during e.g. a shirring operation via a spray, because external application e.g. by dipping would require a complex and more costly operation of turning the tube inside out to provide contact between the myoglobin blooming agent and the meat contact surface. Application of other additives and coating compositions via solution spraying during or just prior to shirring is convenient, economical and facilitates placement of a regular measured distribution of a coating on the interior tube surface. For example, lubricants and other compositions have been applied by various means such as slugging, spraying, or contact coating the inner surface of a tubular polymeric casing via a shirring mandrel and such means are well known (See e.g. U.S. Pat. No. 3,378,379 (Shiner); U.S. Pat. No. 3,451,827 (Bridgeford); U.S. Pat. No. 4,397,891 (Kaelberer et al); U.S. Pat. No. 5,256,458 (Oxley et al); U.S. Pat. No. 5,573,800 (Wilhoit); and U.S. Pat. No. 6,143,344 (Jon et al) which are all incorporated by reference in their entireties.) Plastic casings made according to the present invention, may be coated with the inventive myoglobin blooming agent preferably by slugging to provide a uniformly thick coating.

Tubular forms or nontubular (e.g. sheets or webs) forms of the heat shrinkable film may be coated by dry or wet spraying or dusting or by roll coating or coating using a Meyer bar or doctor blade, or by printing means e.g. using gravure or flexography printing or by using electrostatic transfer. Also, application may occur at various points in the manufacturing process including for example, by blending, incorporation in a masterbatch or addition to the polymeric layer prior to extrusion, or by dusting, spraying or coating during or after extrusion or during bubble or tube formation or during winding, or bag making e.g. in a dusting or powdering step.

In one embodiment of the invention, it is contemplated that a food contact surface layer may comprise between about 1,000 ppm (0.1%) and about 50,000 ppm (5.0%) of a myoglobin blooming agent such as sodium nitrite, more preferably about 5,000 ppm to about 25,000 ppm, and most preferably about 7,500 ppm to about 20,000 ppm. Typically, a food contact surface layer comprises about 1.5 wt. % to about 2.0 wt. % or less (15,000 ppm-20,000 ppm) of a nitrite salt for packaging a fresh ground beef product, or about 0.75 wt. % to about 1.5 wt. % of a nitrite salt for packaging a fresh pork meat product. Amounts in a range of 0.75 to 2.25 wt. % may be advantageously employed for a variety of meats.

According to the invention, single-layer heat-shrinkable packaging films may be provided that comprise a myoglobin blooming agent. In another embodiment the heat-shrinkable film may also be a multilayer film. The inventive heat shrinkable packaging films can have any suitable composition or configuration. Preferably, the heat-shrinkable packaging film fulfills multiple functional requirements which may be present in one or more or a combination of layers. For example a single layer film may combine the functions of oxygen barrier, heat shrinkability, and myoglobin blooming agent contact with one or more additional functions such as puncture resistance, abuse resistance, printability, moisture barrier, heat sealability, transparency, high gloss, low toxicity, high temperature resistance, low temperature flexibility, etc. Alternatively, multiple layers may be employed to add functionality. The present invention is adapted for use in a wide variety of commercially available packaging films such as those sold by: Curwood, Inc. under the trademarks ABP, Clear-Tite, Cook-Tite, Perflex, Pro-Guard, Pro-Tite, and Surround; and by others e.g. marketed under the Alcan, Cryovac, Krehalon, Vector, and Viskase, brands. A typical beneficial heat shrinkable film according to the present invention may have an interior surface food contact layer which also serves as a sealant layer, and a heat resistant and abuse resistant exterior surface layer with a core layer there between which comprises an oxygen barrier material. Another common suitable film has adhesive layers on either side of the core oxygen barrier layer to connect with the surface layers.

The multilayer heat-shrinkable film embodiments of the present invention may have an exterior surface and an interior surface, and include 2, 3, 4, 5, 6, 7, 8, 9, or more polymeric thermoplastic film layers having desirable levels of free shrink.

Film Thickness

Preferably, the heat shrinkable film has a total thickness of less than about 10 mils, more preferably the film has a total thickness of from about 0.5 to 10 mils (12.5-250 microns ($\mu$)). Advantageously many embodiments may have a thickness from about 1 to 5 mils, with certain typical embodiments being from about 1.5 to 3 mils. For example, entire single or multilayer films or any single layer of a multilayer film can have any suitable thicknesses, including 1, 2, 3, 4, 5, 6, 7, 8, 9, or 10 mils, or any increment of 0.1 or 0.01 mil therebetween. Thicker and thinner films are also provided. Although suitable films for packaging foodstuffs as thick as 4 mils (101.6 microns) or higher, or as thin as 1 mil (25.4 microns) or less may be made, it is expected that the most common films will be between about 1.5-3 mil (38-76 microns). Especially preferred for use as films for food packaging are films where the multilayer film has a thickness of between about 2 to 3 mils (50.8-76.2 microns). Such films may have good abuse resistance and machinability.

The inventive films are heat shrinkable and have at least 10% free shrink in at least one direction at 90° C. or less as more fully described below. Preferably certain embodiments of the invention may have at least 20% shrink at 90° C. in at least one direction (preferably both directions) and advantageously may have at least 30% shrink at 90° C. in at least one direction, and preferably may have at least 25% in both MD and TD directions. Advantageously, the packaging films may have a total free shrink at 90° C. of at least about 30%, more preferably at least 40% or 60% or more.

By being heat shrinkable the film containing a myoglobin blooming agent is brought into intimate contact with the surface of a myoglobin containing food product thereby effecting the transfer of the agent to the food to promote and/or maintain the desired red food color. Points of non-contact may cause meat or bone to remain an undesirable color such as purple under vacuum packaging conditions. Beneficially, heat shrinkable film provides tight, attractive packaging for consumers.

Food Contact/Heat Sealing Layers

It is essential that the heat shrinkable oxygen barrier film of the present invention have a food contact layer. This food contact layer may also function as a heat sealing or heat sealable layer to facilitate formation of hermetically sealed packages, although tubular plastic casings may also be used and sealed e.g. by clips as known in the art. Preferred films of the present invention utilize a food contact layer which has heat sealing properties.

The terms "heat sealing layer" or "sealant layer" are used interchangeably to refer to a layer which is heat sealable i.e., capable of fusion bonding by conventional indirect heating means which generate sufficient heat on at least one film contact surface for conduction to the contiguous film contact surface and formation of a bond interface therebetween without loss of the film integrity. The bond interface between contiguous inner layers preferably has sufficient physical strength to withstand the packaging process and subsequent handling including e.g. tensions resulting from stretching or shrinking attendant with the presence of a food body sealed within a package utilizing a film having a heat sealable layer. Advantageously, the bond interface is preferably sufficiently thermally stable to prevent gas or liquid leakage therethrough when exposed to above or below ambient temperatures e.g. during one or more of the following: packaging operations, storage, handling, transport, display, or processing of food. Heat seals may be designed to meet different conditions of expected use and various heat seal formulations are known in the art and may be employed with the present invention. In certain optional embodiments heat seals may be subjected to pasteurization or cook-in temperatures and conditions, e.g. in a sealed bag or sealed tray form. For use in cook-in applications heat seals should withstand elevated temperatures up to about 160-180° F. (71-82° C.) or higher e.g. 212° F. (100° C.) for extended periods of time e.g. up to 4 to 12 hours in environments which may range from heated humidified air or steam to submersion in heated water. Preferably the food contact or heat seal layer is heat sealable to itself, but may be sealable to other objects, films or layers e.g. to a tray when used as a lidding film, or to an outer layer in a lap seal or in certain tray overwrap embodiments. Also in certain embodiments the myoglobin blooming agent containing food contact layer need not be heat sealable.

A sealing layer is preferably positioned at or near the interior surface of the packaging film, and can be an interior surface layer which allows a monolayer or multilayer film to be formed into a resulting package or bag. The sealant layer may comprise a myoglobin blooming agent and a suitable heat-sealable polymer such as an ethylene-$\alpha$-olefin copolymer. The exterior layer may also be a heat sealable layer and used in place of or in addition to the interior layer for this purpose.

The food contact layer may comprise a sealant layer and may comprise a heat sealable polymeric material such as a polyolefin or blend thereof e.g. polyethylenes such as LDPE, HDPE, ethylene $\alpha$-olefin copolymers including e.g. plastomers, VLDPE, LLDPE or polypropylene homopolymers, polypropylene copolymers, or homogeneous polyolefin resins, such as those made with constrained geometry catalysts or metallocene single-site catalysts, including e.g. copolymers of ethylene or propylene with at least one $C_{4-8\ or\ higher}$ $\alpha$-olefins (e.g. butene-1, hexene-1 or octene-1 or combinations thereof) with a majority of polymeric units derived from ethylene or propylene. Ethylene vinyl acetate (EVA) copolymers, EBAs, EMAs, EMAAs or EEAs are also suitable materials for forming the inner surface heat sealable layer. A food contact and/or sealant layer may also comprise an ionomer which is essentially a metal salt neutralized copolymer of ethylene and acrylic or methacrylic acid, Suitable sealant/food contact layer materials often include ionomers, polyolefins or blends thereof, such as those disclosed in U.S. Pat. Nos. 6,815,023; 6,773,820; 6,682,825; 6,316,067; and 5,759, 648; 5,663,002; and U.S. Patent Application Publication Nos.: 2005/0129969 (Schell et al); and 2004/0166262 (Busche et al.). Food contact or sealant layers may also comprise nylon or polyesters such as polyester terephthalate (PET) or copolymers or blends thereof. The food contact layer may be 100% of the thickness of, the total structure. The food contact or sealant layers in multilayer structures may be of any thickness with thicknesses in multilayer structures of up to 1% to 5% to 15% to 50% or more of the total thickness contemplated. Preferred examples of such sealable resins comprising a food contact and/or sealant layer include ethylene $\alpha$-olefin copolymers commercially available from: Dow Chemical Company under a trade name of "AFFINITY" or "ELITE" (including octene-1 as α-olefin); and ExxonMobil Co. under a trade name of "EXACT" (including hexene-1 as comonomer); and ionomers commercially available from DuPont Company under the trade name Surlyn®.

Barrier Layers

Barrier layers can be made comprising a myoglobin blooming agent. The barrier layer preferably function as a gas barrier layer, although other types of barriers such as moisture barrier layers can also include the myoglobin blooming agent. The gas barrier layer is preferably an oxygen barrier layer, and is preferably a core layer positioned between the first and second layers. For example, the oxygen barrier layer can be in contact with a first surface layer and an adhesive layer or may be sandwiched between two tie layers and/or two surface layers.

To achieve all the benefits of the present invention it is essential that the myoglobin blooming agent film be used in a package in combination with a reduced oxygen atmosphere. In one aspect, an oxygen barrier is used in the meat package or packaging film that is maintained at a reduced oxygen atmosphere. The oxygen barrier is preferably selected to provide an oxygen permeability sufficiently diminished to permit a desirable color to be induced or maintained within the packaged meat. For example, a film may comprise an oxygen barrier having an oxygen permeability that is low enough to reduce the activity of metmyoglobin reducing enzymes to reduce myoglobin in the meat, and/or maintain a reduced oxygen atmosphere in contact with the meat to reduce oxygen binding to myoglobin on the surface of the packaged fresh meat.

The barrier layer can comprise any suitable material, such as nylon, EVOH or PVDC. The barrier layer can provide a suitable barrier to oxygen for the desired preservation of the article to be packaged under the anticipated storage conditions. An oxygen barrier layer can comprise EVOH, polyvinylidene chloride, polyamide, polyester, polyalkylene carbonate, polyacrylonitrile, nanocomposite, a metallized film such as aluminum vapor deposited on a polyolefin, etc., as known to those of skill in the art. The barrier layer preferably also provides desirable optical properties when stretch oriented, including transparency and low haze and a stretching behavior compatible with the layers around it. It is desirable that the thickness of the barrier layer be selected to provide the desired combination of the performance properties sought e.g. with respect to oxygen permeability, shrinkage values especially at low temperatures, ease of orientation, delamination resistance, and optical properties. Suitable thicknesses in multilayer films are less than 15%, e.g. from 3 to 13% of the total film thickness and preferably less than about 10% of the total thickness of the multilayer film. Greater thicknesses may be employed however oxygen barrier polymers tend to be relatively expensive and therefore it is expected that less costly resins will be used in other layers to impart desirable properties once a suitable thickness is used to achieve the desired gas barrier property for the film layer combination. For example, the thickness of a core oxygen barrier layer may advantageously be less than about 0.45 mil (10.16 microns) and greater than about 0.05 mil (1.27 microns), including 0.10, 0.20, 0.25, 0.30, 0.40, or 0.45 mil thick.

Preferably, multilayer films include a core oxygen barrier layer. Any suitable material can be used to form an oxygen barrier layer. The oxygen barrier layer of a film may comprise EVOH, although oxygen barrier layers comprising polyvinylidene chloride-vinyl chloride copolymer (PVDC or VDC-VC) or vinylidene chloride-methylacrylate copolymer (VDC-MA) as well as blends thereof, can also be used. One preferred EVOH barrier material is a 44 mol % EVOH resin E151B sold by Eval Company of America, under the trade name Eval® LC-E151B. Another example of an EVOH that may be acceptable can be purchased from Nippon Gohsei under the trade name Soamol® AT (44 mol % ethylene EVOH). Oxygen barrier films comprising EVOH for packaging food products containing a myoglobin blooming agent can be formed by methods disclosed in U.S. Pat. Nos. 7,018, 719; 6,815,023; 6,777,046; 6,511,688; 5,759,648; 5,382,470; and 4,064,296 all of which are incorporated by reference in their entireties.

Suitable nylons or nylon blends may also be used to impart oxygen barrier properties. Combinations of barrier materials may also be used. For example, multiple barrier layers of nylon and EVOH are often used to impart suitable barrier properties in food and meat packaging as are blends of EVOH and nylon. These and other known materials can also be used to form an oxygen barrier layer.

For perishable food packaging, the oxygen ($O_2$) permeability desirably should be minimized. Typical oxygen barrier films will have an $O_2$ permeability of less than about 310 $cm^3/m^2$ for a 24 hour period at 1 atmosphere, 0% relative humidity and 23° C., and preferably less than 75 $cm^3/m^2$, more preferably less than 20 $cm^3/m^2$. Barrier resins such as PVDC or EVOH in the core layer may be adjusted by blending in compatible polymers to vary orientation parameters or the gas permeability e.g. $O_2$ of the films. The thickness of the core layer may also be varied and beneficially may be from about 0.05 to about 0.30 mils (1.3-7.62 microns).

Abuse-Resistant Outer Layer

Since it is seen by the user/consumer, in both the monolayer and multilayer embodiments of the invention the exterior surface of the film should enhance optical properties of the film and may preferably have high gloss. Also, it should withstand contact with sharp objects and provide abrasion resistance, and for these reasons it is often termed the abuse-resistant layer. This exterior abuse-resistant layer may or may not also be used as a heat sealable layer. As the exterior surface layer of the film, this layer most often is also the exterior layer of any package, bag, pouch or other container made from the inventive film, and is therefore subject to handling and abuse e.g. from equipment during packaging, and from rubbing against other packages and shipping containers and storage shelves during transport and storage. This contact causes abrasive forces, stresses and pressures which may abrade away the film causing defects to printing, diminished optical characteristics or even punctures or breaches in the integrity of the package. Therefore the exterior surface layer is typically made from materials chosen to be resistant to abrasive and puncture forces and other stresses and abuse which the packaging may encounter during use. The exterior surface layer should be easy to machine (i.e. be easy to feed through and be manipulated by machines e.g. for conveying, packaging, printing or as part of the film or bag manufacturing process). It should also facilitate stretch orientation where a high shrinkage film is desired, particularly at low temperatures such as 90° C. and lower. Suitable stiffness, flexibility, flex crack resistance, modulus, tensile strength, coefficient of friction, printability, and optical properties are also frequently designed into exterior layers by suitable choice of materials. This layer may also be chosen to have characteristics suitable for creating desired heat seals which may be heat resistance to burn through e.g. by impulse sealers or may be used as a heat sealing surface in certain package embodiments e.g. using overlap seals.

The exterior layer is preferably formed of a similar blend to that of the interior layer. In one embodiment at least one and preferably both interior and exterior layers utilize polyolefin resins, preferably a blend of (i) EVA, (ii) EAO (such as VLDPE), and (iii) an ethylene-hexene-1 copolymer having an mp of 80 to 98° C., preferably 80 to 92° C. Each of the three polymers typically comprises 20 to 40 wt. % of the layer. EVA when used in the outer layer preferably has 3% to 18% vinyl acetate content to provide good shrinkability. Blends of EAOs are also usefully employed in the outer layer.

The exterior layer thickness is typically 0.5 to 1.0 mils. Thinner layers may be less effective for abuse resistance, however thicker layers, though more expensive, may advantageously be used to produce films having unique highly desirable puncture resistance and/or abuse resistance properties. Heavy gauge films, typically 5 to 7 mils or more, are needed in demanding applications which are usually satisfied by very expensive and complex laminated film structures and/or secondary packaging materials such as bone guards, pads, and overwrap.

In one barrier layer embodiment of this invention an exterior thermoplastic layer of the enclosing multilayer film is on the opposite side of a core layer from the interior layer, and in direct contact with the environment. In a suitable three layer embodiment this exterior layer is directly adhered to the core layer which is preferably an oxygen barrier layer.

Intermediate Layers

An intermediate layer is any layer between the exterior layer and the interior layer and may include oxygen barrier layers, tie layers or layers having functional attributes useful for the film structure or its intended uses. Intermediate layers may be used to improve, impart or otherwise modify a multitude of characteristics: e.g. printability for trap printed structures, shrinkability, orientability, processability, machinability, tensile properties, drape, flexibility, stiffness, modulus, designed delamination, easy opening features, tear properties, strength, elongation, optical, moisture barrier, oxygen or other gas barrier, radiation selection or barrier e.g. to ultraviolet wavelengths, etc.

Tie Layers

In addition to the exterior layer, the interior layer, and intermediate layer such as a barrier layer, a multilayer heat shrinkable packaging film can further comprise one or more adhesive layers, also known in the art as "tie layers," which can be selected to promote the adherence of adjacent layers to one another in a multilayer film and prevent undesirable delamination. A multifunctional layer is preferably formulated to aid in the adherence of one layer to another layer without the need of using separate adhesives by virtue of the compatibility of the materials in that layer to the first and second layers. In some embodiments, adhesive layers comprise materials found in both the first and second layers. The adhesive layer may suitably be less than 10% and preferably between 2% and 10% of the overall thickness of the multilayer film. Adhesive resins are often more expensive than other polymers so the tie layer thickness is usually kept to a minimum consistent with the desired effect. In one embodiment, a multilayer film comprises a three layer structure with an adhesive layer positioned between and in contact with the first layer and the second layer. In another embodiment, a multilayer film comprises a multilayer structure comprising a first adhesive layer positioned between and in direct contact with the exterior layer and a core oxygen barrier layer; and preferably and optionally has a second tie layer between and in direct contact with the same core oxygen barrier layer and the interior layer to produce a five layer film.

Multilayer films can comprise any suitable number of tie or adhesive layers of any suitable composition. Various adhesive layers are formulated and positioned to provide a desired level of adhesive between specific layers of the film according to the composition of the layers contacted by the tie layers.

For example adhesive layers in contact with a layer comprising a polyester, such as PET, preferably comprise a suitable blend of polyolefins with other adhesive polymers. One preferred component of an adhesive layer in contact with a PET polyester layer is EMAC SP 1330 (which reportedly has: a density of 0.948 g/cm$^3$; melt index of 2.0 g/10 min.; a melting point of 93° C.; is at softening point of 49° C.; and a methylacrylate (MA) content of 22%).

The interior, exterior, intermediate or tie layers may be formed of any suitable thermoplastic materials, for example, polyamides, polystyrenes, styrenic copolymers e.g. styrene-butadiene copolymer, polyolefins, and in particular members of the polyethylene family such as LLDPE, VLDPE, HDPE, LDPE, ethylene vinyl ester copolymer or ethylene alkyl acrylate copolymer, polypropylenes, ethylene-propylene copolymers, ionomers, polybutylenes, alpha-olefin polymers, polyesters, polyurethanes, polyacrylamides, anhydride-modified polymers, acrylate-modified polymers, polylactic acid polymers, or various blends of two or more of these materials.

In another embodiment, the exterior, interior and/or one or more intermediate layers can comprise or consist essentially of a nylon blend composition. Preferably, the nylon blend composition comprises at least an amorphous nylon such as nylon 6I/6T copolymer, in combination with at least one semi-crystalline nylon homopolymer or copolymer such as nylon 6/12, 6/69, 6/66, MXD6, 6, 11, or 12.

In another embodiment of the invention one or more of the exterior, interior and/or one or more intermediate layers comprises at least one polyester polymer. Preferred polyester polymers comprise aromatic polyesters and more preferably, are homopolymers or copolymers of poly(ethylene terephthalate) (PET), poly(ethylene naphthalate) and blends thereof. Suitable polyesters may have an intrinsic viscosity of about 0.60 to about 1.2, preferably between 0.60 to 0.80. The polyester may be an aliphatic polyester resin, but is preferably an aromatic polyester resin. For example, polyester materials can be derived from dicarboxylic acid components, including terephthalic acid and isophthalic acid as preferred examples, and also dimers of unsaturated aliphatic acids. Examples of a diol component as another component for synthesizing the polyester may include: polyalkylene glycols, such as ethylene glycol, propylene glycol, tetramethylene glycol, neopentyl glycol, hexamethylene glycol, diethylene glycol, poly-ethylene glycol and polytetra methylene oxide glycol; 1,4-cyclohexane-dimethanol, and 2-alkyl-1,3-propanediol. More specifically, examples of dicarboxylic acids constituting the polyester resin may include: terephthalic acid, isophthalic acid, phthalic acid, 5-t-butylisophthalic acid, naphthalenedicarboxylic acid, diphenyl ether dicarboxylic acid, cyclohexane-dicarboxylic acid, adipic acid, oxalic acid, malonic acid, succinic acid, azelaic acid, sebacic acid, and dimer acids comprising dimers of unsaturated fatty acids. These acids may be used singly or in combination of two or more species. Examples of diols constituting the polyester resin may include: ethylene glycol, propylene glycol, tetramethylene glycol, neopentyl glycol, hexamethylene glycol, diethylene glycol, polyalkylene glycol, 1,4-cyclohexane-dimethanol, 1,4-butanediol, and 2-alkyl-1,3-propane diol. These diols may be used singly or in combination of two or more species.

Polyester compositions that comprise an aromatic polyester resin comprising an aromatic dicarboxylic acid component can be preferred in some aspects, including, e.g., polyesters between terephthalic acid (as a dicarboxylic acid) and diols having at most 10 carbon atoms, such as polyethylene terephthalate and polybutylene terephthalate. Particularly preferred examples thereof may include: copolyesters obtained by replacing a portion, preferably at most 30 mol %, more preferably at most 15 mol %, of the terephthalic acid with another dicarboxylic acid, such as isophthalic acid; copolyesters obtained by replacing a portion of the diol component such as ethylene glycol with another diol, such as 1,4-cyclohexane-dimethanol (e.g., "Voridian 9921", made by Voridian division of Eastman Chemical Co.); and polyester-polyether copolymers comprising the polyester as a predominant component (e.g., polyester-ether between a dicarboxylic acid component principally comprising terephthalic acid or/and its ester derivative and a diol component principally comprising tetramethylene glycol and tetramethylene oxide glycol, preferably containing the polytetra methylene oxide glycol residue in a proportion of 10-15 wt. %). It is also possible to use two or more different polyester resins in mixture. Examples of preferred polyesters are available under the trademarks Voridian 9663, Voridian 9921 and EASTAR® Copolyester 6763, all from Eastman Chemical Company, Kingsport, Tenn., U.S.A. U.S. Pat. No. 6,964,816 to Schell et al. and U.S. Pat. No. 6,699,549 to Ueyama et al., which are incorporated herein by reference in their entireties, disclose multilayer structures comprising a polyester layer, and a polyamide layer.

Optional Additives to Layers

Various additives may be included in the polymers utilized in one or more of the exterior, interior and intermediate or tie layers of food packaging comprising the same. For example, a layer may be coated with an anti-block powder. Also, conventional anti-oxidants, antiblock additives, polymeric plasticizers, acid, moisture or gas (such as oxygen) scavengers, slip agents, colorants, dyes, pigments, organoleptic agents may be added to one or more film layers of the film or it may be free from such added ingredients. If the exterior layer is corona treated, preferably no slip agent will be used, but it will contain or be coated with an anti-block powder or agent such as silica or starch. Processing aides are typically used in amounts less than 10%, less than 7% and preferably less than 5% of the layer weight. A preferred processing aid for use in the outer layer of the film includes one or more of fluoroelastomers, stearamides, erucamides, and silicates.

Preferred films may also provide a beneficial combination of one or more or all of the properties including low haze, high gloss, high shrinkage values at 90° C. or less, good machinability, good mechanical strength and good barrier properties including high barriers to oxygen and water permeability.

Methods of Manufacture

The inventive monolayer or multilayer film may be made by conventional processes which are modified to provide for inclusion of a myoglobin blooming agent. These processes to produce flexible films may include e.g. cast or blown film processes, but will include a stretching or orientation process under conditions to produce a film which is uniaxially or biaxially heat shrinkable at 90° C. or less. In the present invention a heat shrinkable film is provided to be heat shrunken about a food product such as meat to form a package. Thus, a heat shrunk film pouch will advantageously cling to the packaged foodstuff to facilitate transfer of the myoglobin blooming agent. Non-shrink bags have an undesirable wrinkled appearance with excess film forming "ears", tabs and other protrusions, and internal forces e.g. from whole bird poultry wings and legs or purge of internal juices or gases may cause loss of contact with food product surfaces which are undesirable. Once the film separates from the enclosed article surface, the myoglobin blooming agent is not in contact and oxygen may also come into contact with the article surface and either event may result in an undesirably nonuniform color or other product defects.

The monolayer and multilayer films may be manufactured by known methods in the art as modified as described herein for inclusion of a myoglobin blooming agent. Descriptions of suitable film manufacturing and orientation processes are disclosed in e.g. U.S. Pat. Nos. 5,759,648, 6,316,067 and 6,773,820, and U.S. Patent Application Publication No. 2004/0166262 (Busche et al.), entitled, "Easy open heat-shrinkable packaging," all of which are incorporated herein by reference in their entireties.

Various manufacturing methods may be used as will be apparent to those skilled in the art in view of the present teaching. For example, U.S. Pat. No. 4,448,792 (Schirmer) discloses a method comprising the steps of coextrusion, biaxial orientation and irradiation, and U.S. Pat. No. 3,741,253 (Brax et al.) discloses a method of extrusion, irradiation, extrusion lamination/coating and biaxial orientation, and both patents are hereby incorporated by reference in their entireties.

In a preferred process for making films, the resins and any additives are introduced to an extruder (generally one extruder per layer) where the resins are melt plastified by heating and then are transferred to an extrusion (or coextrusion) die for formation into a tube. Extruder and die temperatures will generally depend upon the particular resin or resin containing mixtures being processed and suitable temperature ranges for commercially available resins are generally known in the art, or are provided in technical bulletins made available by resin manufacturers. Processing temperatures may vary depending upon other process parameters chosen. However, variations are expected which may depend upon such factors as variation of polymer resin selection, use of other resins e.g. by blending or in separate layers in the multilayer film, the manufacturing process used and particular equipment and other process parameters utilized. Actual process parameters including process temperatures are expected to be set by one skilled in the art without undue experimentation in view of the present disclosure.

As generally recognized in the art, resin properties may be further modified by blending two or more resins together and it is contemplated that various resins including e.g. homopolymers and copolymers may comprise or be blended into individual layers of the multilayer film or added as additional layers, such resins include polyolefins such as ethylene-unsaturated ester copolymer resins, especially vinyl ester copolymers such as EVAs, or other ester polymers, very low density polyethylene (VLDPE), linear low density polyethylene (LLDPE), low density polyethylene (LDPE), high density polyethylene (HDPE), ionomers, polypropylenes, or blends thereof. Other polymers that may be included as separate layers or in combination include polyamides such as nylon, PVDC, EVOH, and PET. These resins and others may be mixed by well known methods using commercially available tumblers, mixers or blenders.

Also, if desired, well known additives such as anti-oxidants, processing aids, slip agents, antiblocking and antifogging agents, pigments, etc., and mixtures thereof may be incorporated into the film. For example, the myoglobin blooming agent containing layer and/or other layers may further comprise an antioxidant, a slip agent, an antiblock agent, a colorant, a color enhancer, a flavorant, an odorant, an organoleptic agent, a coefficient of friction modifying agent, a lubricant, a surfactant, an encapsulating agent, an oxygen scavenger, a pH modifying agent, a film forming agent, an emulsifier, a polyphosphate, a humectant, a drying agent, an antimicrobial agent, a chelating agent, a binder, a starch, a polysaccharide, a stabilizer, a buffer, a phospholipid, an oil, a fat, a protein, a polysaccharide, a transfer agent, or a combination thereof. Examples of particular compositions that may be added include: α-tocopherol; alcohol; annatto; ascorbic acid; beet powder; BHA; BHT; bixin; caramel; carmine; carotenoid pigment; casein; cochineal; cyclodextrin; dextrin; erucamide; ethoxylated mondiglycerides; fluoroelastomer; food grade oil; glycerine; lecithin; liquid smoke; nisin; norbixin; pediocin; polysorbate; potassium chloride; rosemary extract; shellac; sodium chloride; sodium erythorbate; starch; trisodium polyphosphate; turmeric; water; water soluble cellulose ether; and zein.

Various polymer modifiers may be incorporated for the purpose of improving toughness, orientability, extensibility and/or other properties of the film. Other modifiers which may be added include modifiers which improve low temperature toughness or impact strength and modifiers which reduce modulus or stiffness. Exemplary modifiers include styrene-butadiene, styrene-isoprene, and ethylene-propylene copolymers.

As used herein, the phrase "machine direction", herein abbreviated "MD", refers to a direction "along the length" of the film, i.e., in the direction of the film as the film is formed during extrusion and/or coating. As used herein, the phrase "transverse direction", herein abbreviated "TD", refers to a direction across the film, perpendicular to the machine or longitudinal direction.

The films are made heat shrinkable, preferably by stretch orientation. Stretch orientation may be accomplished by various known methods e.g. machine direction (MD) orientation is preferably accomplished with the use of sets of nip rolls rotating at different speeds to stretch or draw the film, sheet or tube in the machine direction thereby causing machine direction elongation which is set by cooling. Other methods include tentering which is commonly employed to orient sheets, or the well-known trapped bubble or double bubble technique for orienting tubes as for example described in U.S. Pat. No. 3,456,044 (Pahlke) which is hereby incorporated by reference in its entirety. In the bubble technique, an extruded primary tube leaving a tubular extrusion die is cooled, collapsed and then preferably oriented by reheating and inflating to form an expanded secondary bubble, which is again cooled and collapsed. This collapsed stretched film may be wound on a reel as a tube or slit into sheets or webs and wound, or it may be further processed e.g. by annealing or irradiation as described below.

Preferred films are biaxially stretched. Transverse direction (TD) orientation is accomplished by the above noted inflation to radially expand the heated film which is cooled to set the film in an expanded form or by pulling the film in the transverse direction during tentering. Orientation may be in either or both directions. Preferably, a primary tube is simultaneously biaxially stretched radially (transversely) and longitudinally (machine direction) to produce a multilayer film which is heat shrinkable at temperatures below the melting points of the major polymeric components, e.g., at 90° C. or lower. The stretch ratio during orientation should be sufficient to provide a film with a total thickness of 10 mil or less and preferred films will be under 5 mil and typically between about 1.0 and 4.0 mils. The MD stretch ratio is typically 2½-6 and the TD stretch ratio is also typically 2½-6. An overall or total stretch ratio (MD stretch multiplied by TD stretch) of about 6¼×-36× is suitable.

Axially stretched, especially biaxially stretched, films which are "heat shrinkable" as that term is used herein have at least 10% unrestrained shrinkage at 90° C. in at least one of the machine direction (MD) or transverse direction (TD). Preferably for biaxially stretched films there is at least 10% shrink in each of the MD and TD for a total free shrink of at least 20%. One or more of the film layers may be oriented either uniaxially or biaxially by axial stretching at temperatures low enough to produce low temperature, high shrink multilayer films e.g. at 85° C., 80° C., 74° C. or lower. Such heat shrinkable multilayer films will have at least 10% shrink in at least one direction at 90° C., but beneficially may have at least 10% shrink at one or more of the lower temperatures in at least one, but preferably both MD and TD directions and preferably at least 15% (more preferably at least about 20%) in at least one direction at 85, 80, or 74° C.

The general annealing process by which biaxially stretched heat shrinkable films are heated under controlled tension to reduce or eliminate shrinkage values is well known in the art. If desired, films may be annealed to produce lower shrinkage values as desired for the particular temperature.

Optionally, films of the present invention may be subject to a variety of irradiative treatments. In the irradiation process, the film is subjected to an energetic radiation treatment, such as corona discharge, plasma, flame, ultraviolet, X-ray, gamma ray, beta ray, and high energy electron treatment. These irradiative treatments may be performed for a variety of reasons including e.g. modifying surface characteristics to improve surface adhesion to a variety of substances such as meat or printing ink, or to improve internal layer adhesion to ameliorate intralayer adhesion and avoid undesirable delamination. An important known use of irradiation is to induce cross-linking between molecules of the irradiated material. The irradiation of polymeric films to induce favorable properties such as crosslinking is well known in the art and is disclosed in U.S. Pat. No. 4,737,391 (Lustig et al) and U.S. Pat. No. 4,064,296 (Bornstein et al.), which are hereby incorporated by reference in their entireties. Bornstein et al. discloses the use of ionizing radiation for crosslinking the polymer present in the film. In some preferred embodiments, it is preferred to crosslink the entire film to broaden the heat sealing range. This is preferably done by irradiation with an electron beam at dosage levels of at least about 2 megarads (MR) and preferably in the range of 3 to 8 MR, although higher dosages may be employed. Irradiation may be done on the primary tube, with or without additional layers being coated thereon, or after biaxial orientation. The latter, called post-irradiation, is described in U.S. Pat. No. 4,737,391 (Lustig et al.). An advantage of post-irradiation is that a relatively thin film is treated instead of the relatively thick primary tube, thereby reducing the power requirement for a given treatment level.

Alternatively, crosslinking may be achieved by addition of a chemical crosslinking agent or by use of irradiation in combination with a crosslinking modifier added to one or more of the layers, as for example described in U.S. Pat. No. 5,055,328 (Evert et al.).

Fundamental to the present invention is inclusion of a myoglobin blooming agent with a heat shrinkable oxygen barrier film. The packaging films can have any suitable structure, but it is essential that the myoglobin blooming agent be on, or in, or able to migrate to, a food contact portion of the heat shrinkable film.

Whether the myoglobin blooming agent is coated on or incorporated within an interior food contact layer, it may be applied by any suitable method, e.g. as described above, including dry or wet spraying, dusting, blending, coating e.g. with transfer rollers, slugging, inclusion in a masterbatch, printing, etc. The myoglobin blooming agent is preferably evenly dispersed over the contact surface of the layer and/or throughout the entire layer to enable any length of film incorporating the layer to include approximately similar amounts of the compound within the sealing layer for a uniform transfer to meat via surface contact.

Where the myoglobin blooming agent is coated on the film food contact layer surface it may be conveniently applied at various times. For example, the agent may be applied to the meat surface e.g. by dipping or spraying just before packaging, or during a bag making operation with or without admixture with starch used as a means to facilitate subsequent bag opening. It may be applied during winding operations attendant to slitting operations or during pouch making or tube making. It may be applied before or after irradiative treatments. It may be applied with or in place of starch utilizing electron beam irradiation and/or corona treatment as further described in U.S. Pat. No. 5,407,611 (Wilhoit et al.) which is hereby incorporated by reference. Agents such as nitrite or nitrate are soluble in water or alcohol, and solutions of myoglobin blooming agent may be coated on films either alone or incorporated with other agents such as film forming and/or wetting agents or other materials such as zein, casein, dextrin, starch, or shellac, etc. used e.g. with respect to transferring bixin as described in U.S. Pat. No. 6,143,344 (Jon et al) which is hereby incorporated by reference. The agent may also be applied in an aqueous solution to a film whose food contact surface has been modified to be hydrophilic or adapted or otherwise modified to adsorb or absorb water or oil based liquids containing a myoglobin blooming agent. According to the present invention in one aspect transferable modifier-containing films may be utilized to transfer myoglobin blooming agents using e.g. films having a food contact layer formulation suitable for effecting transfer as described in U.S. Pat. No. 5,288,532 (Juhl et al); U.S. Pat. No. 5,374,457 (Juhl et al); U.S. Pat. No. 5,382,391 (Juhl et al); and U.S. Pat. No. 6,667,082 (Bamore et al) which are all hereby incorporated by reference.

Where the myoglobin blooming agent is incorporated within the interior layer, it may be added to a base polymer before or during extrusion of the film. The base polymer may be any suitable polymer e.g. a polyolefin such as a polyethylene, and may be very low density polyethylene (VLDPE), linear law density polyethylene (LLDPE), low density polyethylene (LDPE), EVA, polypropylene, ionomer, nylon, PVDC, PET, etc. Melt blending is a suitable method of mixing the base polymer and the myoglobin blooming compound. The individual component materials may be combined in a high intensity mixing device such as an extruder. The base polymer is melted to form a viscous liquid or "melt." The myoglobin blooming compound may be combined with the polymer before, during, or after melting. The high intensity mixing device is used to attempt to uniformly disperse the myoglobin blooming compound within the base polymer. The quality and functionality of the dispersed agent can depend upon the choice of myoglobin blooming agent, the composition of the base polymer and the mixing device. It is desirable to achieve good mixing for uniform dispersion of the myoglobin blooming agent within the melt; the presence of poorly wetted particle agglomerations is undesirable. It may be desirable to include additives in the blend such as e.g. anti-oxidants, anti-block or slip agents.

The myoglobin blooming agent may be either directly added to the base polymer or provided in a solution such as an aqueous or oil based solution that is added to the polymer either before or during the melt state of the polymer. For direct addition of a solid, granular or particulate agent grinding the solid agent to produce smaller particles is expected to provide a more uniform dispersion. It is expected that for a water soluble material, providing the myoglobin blooming agent as an aqueous solution may provide better dispersion of the compound within the polymer relative to addition of undissolved agent. An aqueous solution may be prepared from a water soluble myoglobin blooming agent such as sodium nitrite, preferably close to the saturation concentration of the aqueous solution and may e.g. include between about 20 wt % and about 42 wt % of a compound which acts as a myoglobin blooming agent. This aqueous solution may be directly introduced into a polymer melt e.g. in an extruder heated to a temperature above 300° F. to facilitate mixing to form a blend. If added as a solution provision should be made for venting water vapor from the extruder. The polymer blend containing a myoglobin blooming agent may be either extruded into pellets, or directly as a film.

The myoglobin blooming agent may be mixed with a carrier resin or base polymer to form a masterbatch. Pellets from the masterbatch may be convenient for subsequent use in fabricating articles. Pellets from the masterbatch may then be mixed with the base polymer or another polymer during a film forming process.

When used to create a masterbatch, a sufficient amount of the solution may be introduced into the polymer melt to obtain a blend having a high concentration of myoglobin blooming agent e.g. between about 2 wt % and about 10 wt % myoglobin blooming compound, and preferably between about 4 wt % and about 6 wt %.

Monolayer Barrier Films

In one embodiment of the invention, monolayer heat shrinkable, oxygen barrier packaging films are provided which comprise a food contact layer including a myoglobin blooming agent. The agent may either be coated onto the surface of the monolayer film or it may be incorporated therein e.g. during the extrusion process. A nylon blend of an amorphous nylon such as nylon 6I,6T with one or more semi-crystalline nylons such as copolymers nylon 6/12, 6/66, 6/69 and/or homopolymers nylon 6, 11, 12, MXD6 and 66 may be made into a heat shrinkable film as disclosed e.g. in U.S. Pat. No. 5,344,679 (Vicik) which is hereby incorporated by reference in its entirety. Such film has both heat shrinkability and provides an oxygen barrier and may have a myoglobin blooming agent coated on or incorporated therein.

Multilayer Barrier Films

Multilayer oxygen barrier, heat shrinkable films having a myoglobin blooming agent that contacts a packaged meat product surface can desirably promote, preserve or enhance a desirable myoglobin-mitigated red color.

In one aspect of the embodiment, a myoglobin blooming agent is included in the food contact layer, which is preferably a sealant layer. Multilayer films advantageously may utilize one or more additional layers to provide beneficial film properties. Multilayer films have increased flexibility of application over monolayer films in that specific layers may be provided to incorporate specific features. Sometimes materials which may be unsuitable alone may be advantageously employed in a multilayer construction. For example, EVOH has oxygen barrier properties which are very sensitive to moisture and detrimentally impacted thereby, but when protected from contact with moisture by adjacent moisture barrier layers EVOH may provide a film having an excellent oxygen barrier. Oxygen barrier layers may be positioned between an abrasion or abuse resistant layer and a food contact layer containing myoglobin blooming agent to protect the oxygen barrier and permit thinner oxygen barrier layers to be used. Where EVOH barrier materials are used, it is contemplated that a polyamide-containing layer may optionally be in contact with the EVOH material. Non-limiting examples of various preferred multilayer film configurations include the following:

Abuse Resistant (Exterior)/$O_2$ Barrier/Food Contact & Sealant (Interior);
Abuse Resistant (Exterior)/Core/$O_2$ Barrier/Core/Sealant (Interior);
Abuse Resistant (Exterior)/Tie/Core/$O_2$ Barrier/Core/Sealant (Interior);
Abuse Resistant (Exterior)/Tie/Core/$O_2$ Barrier/Core/Tie/Sealant (Interior);
Abuse Resistant (Exterior)/Core/Tie/$O_2$ Barrier/Tie/Core/Sealant (Interior);
Abuse Resistant (Exterior)/Tie/$O_2$ Barrier/Tie/Sealant (Interior);
Abuse Resistant (Exterior)/Nylon Core/$O_2$ Barrier/Core/Sealant (Interior);
Abuse Resistant (Exterior)/Tie/Core/$O_2$ Barrier/Nylon Core/Sealant (Interior); and
Abuse Resistant (Exterior)/Tie/Core/$O_2$ Barrier/Nylon Core/Tie/Sealant (Interior)

Some embodiments provide a 3, 4, 5, 6, 7, 8, 9, or more layer coextruded film with desirable levels of abuse resistance, oxygen barrier and heat shrinkability in a multilayer film structure.

Referring now to the drawings, FIG. 1 discloses an example of a three-layer film structure embodiment of the present invention generally designated at reference numeral 10. This embodiment is directed to a multilayer composite comprising an outer layer 12 that is an exterior layer 102 comprising a material such as a polyolefin, PET or a nylon composition, and an outer layer 14 that is a sealant layer 122, each joined to opposite sides of a core tie oxygen barrier layer 112 comprising e.g. PVDC. The sealant layer 122 comprises a myoglobin blooming agent such as sodium nitrite or sodium nitrate or blends thereof. The multilayer heat shrinkable film 10 is designed to be used in the packaging of food products and can be used for a casing, bag, pouch or to overwrap a tray or in a form shrink or other vacuum package.

Figure 2:
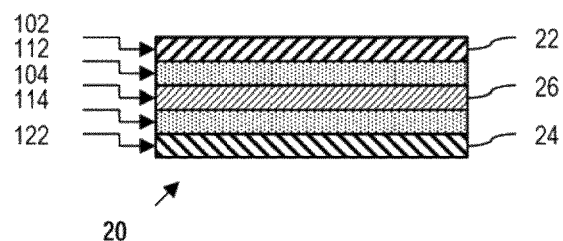
FIG. 2 shows a cross sectional schematic of a second exemplary multilayer film.

Referring now to FIG. 2, a cross section of an example of a five layer heat-shrinkable oxygen barrier film is depicted with film 20 having an exterior surface layer 22 that is an abuse resistant layer 102 joined by a first tie layer 112 to a core and barrier polyamide layer 26 comprising one or more nylon polymers 104, the other side of core layer 26 is joined by a second tie layer 114 to an interior surface layer 24 which is a sealant layer 122 comprising a myoglobin blooming agent.

Placement of one or more core nylon layers in contact with an EVOH oxygen barrier layer can provide multilayer free shrink films with a higher total free shrink or improved processability. In certain embodiments nylon may be blended with EVOH or may be included as adjacent layers e.g. when EVOH oxygen barrier materials have an ethylene content of about 44 mol % or less, at least one and preferably two polyamide core layers may be included in contact with the EVOH layer to facilitate processing.

Figure 3:
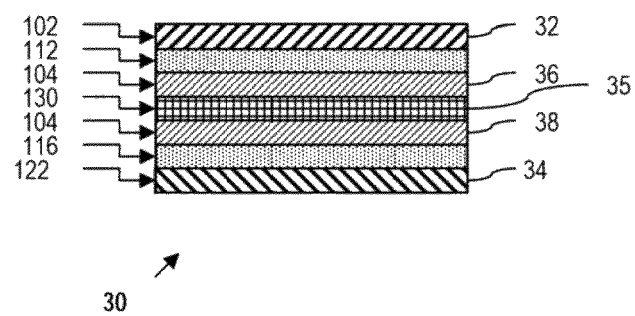
FIG. 3 shows a cross sectional schematic of a third exemplary multilayer film.

Referring now to FIG. 3, a cross-section of an example of a seven layer film 30 is depicted. Film 30 may comprise an exterior layer 32 that is an abuse resistant layer 102 having high gloss and good printability which is in direct contact with a first tie layer 112 and connected thereby to a first core polyamide layer 36 comprising one or more nylon polymers 104. Nylon layer 36 is in direct contact with an oxygen barrier layer 35. Similarly, the other side of the oxygen barrier layer 35 comprising EVOH 130, is joined to a second core polyamide layer 38 comprising one or more nylon polymers 104, the other side of which is joined to a second tie layer 116. The interior layer 34 is a food contact layer 122 which may also be heat sealable and which comprises a myoglobin blooming agent. The food contact sealant layer is joined to the second tie layer 116. Preferably all seven layers are coextruded, but they also be formed by lamination e.g. coating lamination or a combination thereof.

First tie layer 112 promotes or provides adhesion between an abuse resistant layer 102 that is an exterior layer 32, and a core polyamide layer 104. Similarly, tie layer 116 promotes or provides adhesion between a second polyamide layer 38 and a food contact layer 122 that is an interior layer 34. Tie layers 112, and 116 may be identical or different from each other, and may include a wide range of anhydride/grafted polyolefins including those based on ethylene vinyl acetate copolymer, polypropylene, low density polypropylene, linear low density polypropylene, and very low density polyethylene. Preferably, the compositions of tie layers are based on linear low density polyethylene, or plastomers such as metallocene catalyzed polyethylene. Exemplary tie layer resins are manufactured by Equistar Chemical Company under the trade name Plexar®.

Some embodiments provide a multilayer, heat-shrinkable, easy opening, oxygen barrier casing, pouch, bag or food package formed from multilayer films that preferably are at least partially coextruded and more preferably fully coextruded.

Figure 4:
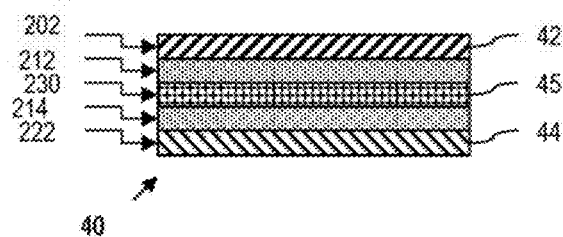
FIG. 4 shows a cross sectional schematic of a fourth exemplary multilayer film.

Referring now to FIG. 4 a cross-sectional view is depicted of an example of a five layer film 40 for use in an easy to peel open, heat shrinkable, oxygen barrier package comprising an exterior surface layer 42 that is preferably a heat sealable polyolefin layer 202 joined to a peelable tie layer 212 which preferably comprises a blend of polybutylene and polyethylene. The opposite side of the peelable tie layer 212 is joined to an intermediate (core) layer 45 preferably comprising a polyolefin 230 such as a blend of polyethylene and EVA, the opposite side of which is joined to an oxygen barrier layer 214 which preferably may be a PVDC blend. The interior myoglobin blooming agent containing surface layer 44 is a heat sealable layer 222 that is joined to the oxygen barrier layer 214. This embodiment provides an easy to peel open version of the inventive film and package. Additional description of such easy to peel open heat shrinkable films may be found in U.S. Patent Publication No. 2004/0166262 (Busche et al) which is hereby incorporated by reference.

Optionally, in another embodiment of the invention the core oxygen barrier layer 214 of the embodiment of FIG. 4 is replaced with a three layer structure of a first tie layer and a second tie layer on opposing sides of an EVOH oxygen barrier layer to provide a 7 layer film.

In yet another embodiment of the invention the core oxygen barrier layer 214 of the embodiment of FIG. 4 is replaced with a five layer structure having an EVOH oxygen barrier layer with first and second nylon layers on opposing sides thereof with a first tie layer in direct contact with the first nylon layer and a second tie layer in direct contact with the second nylon layer to provide a 9 layer heat shrinkable film.

A packaging film according to the present invention has a free shrink value at 90° C. of at least 10% in at least one of the machine direction or transverse direction. The monolayer and multilayer packaging films preferably have a free shrink of at least 30%, more preferably at least 40% at 90° C. in the machine direction, the transverse direction, or in both the machine direction and the transverse direction. Advantageously, in certain embodiments the myoglobin blooming agent containing packaging films have a free shrink in the machine direction of about 30%, 35%, 40%, 45%, 50%, 55%, 60% or greater, including any increment of 1% therebetween, measured at 90° C. and preferably at lower temperatures such as 85, 80 or 74° C. Advantageously, in certain embodiments the myoglobin blooming agent containing packaging films have a free shrink in the transverse direction of about 30%, 35%, 40%, 45%, 50%, 55%, 60% or greater, including any increment of 1% therebetween, measured at 90° C. and preferably at lower temperatures such as 85, 80 or 74° C. Beneficially, packaging films may have a free shrink of at least 40% in two directions. For certain embodiments it is preferred that packaging films have a free shrink of at least 40% in the machine direction and at least 50% in the transverse direction.

Heat-shrinkable films have a total free shrink at 90° C. of at least 10%, and more preferably at least about 20, 30, 40, 50, 60, 70% or greater. Desirably, in certain embodiments heat shrinkable, oxygen barrier, packaging films according to the present invention may have a total free shrink of at least about 50%, 80%, 85%, 90%, 95%, 100%, 105%, 110% or higher measured at 90° C.

Examples of food packaging film products that can be combined with a myoglobin blooming agent in accordance with the teachings include U.S. Pat. Nos. 6,514,583; 4,801, 486; Re35,285; 4,755,403; 6,299,984; 6,221,470; 6,858,275; 4,755,419; 5,834,077; 6,610,392; 6,287,613; 6,074,715; 6,511,568; 6,753,054; 4,610,914; 4,457,960; 6,749,910; 6,815,023; 5,593,747; 5,382,470; and 6,565,985, as well as published U.S. Patent Application No. US 2005/0129969, which are incorporated herein by reference. Preferably, the myoglobin blooming agent is included in the food contact layer of the packaging film, which is preferably a heat sealable layer.

In one aspect of the invention, heat shrinkable films may be provided that comprise a myoglobin blooming agent in combination with a homogeneous alpha-olefin copolymer. For example, the homogenous alpha-olefin copolymer can be an ethylene/$C_{6-10}$ copolymer disclosed in U.S. Pat. No. 6,514, 583 (Ahlgren et al.) including a heat-shrinkable film comprising homogeneous linear ethylene/$C_{3-12}$ alpha-olefin copolymer, the heat-shrinkable film having an impact strength of at least 30 pounds and a total free shrink, at 185° F., of at least 30 percent.

In another aspect of the invention, other known multilayer thermoplastic flexible packaging films can be combined with a myoglobin blooming agent. For example, a myoglobin blooming agent can be combined with the packaging films described in U.S. Pat. No. Re. 35,285 or U.S. Pat. No. 4,801, 486 (Quacquarella et al.) which are incorporated herein by reference. The multilayer thermoplastic packaging films can comprise a myoglobin blooming agent in one or more of the surface layers: (a) a first surface layer which is a heat sealing surface, comprising: a copolymer of ethylene and an alpha-olefin having 4 to 8 carbon atoms per molecule, and comprising 90% to 75% ethylene and 10% to 25% alpha-olefin having 4 to 8 carbon molecules and a density of less than 915 kg/m³; and/or (b) a second surface layer, comprising a polymer selected from the group consisting of amide polymers, ethylene vinyl acetate copolymers, the copolymer of the first surface layer, and ionomers.

Alternatively, a myoglobin blooming agent can be combined with one or more surface layers of the packaging films described in U.S. Pat. No. 6,299,984 (Forloni) which is incorporated herein by reference.

In another aspect of the invention, patches adapted for use in combination with a heat-shrinkable bag, e.g. as disclosed in U.S. Pat. No. 4,755,403 to Ferguson, can be combined with a myoglobin blooming agent.

A monolayer or multilayer patch can comprise a myoglobin blooming agent in at least one layer of a protective heat shrinkable or nonheatshrinkable patch in combination with a biaxially heat shrinkable bag. The patch is preferably biaxially heat shrinkable, and may be adhered to the bag using adhesives, corona treatment or by other means well known in the art. A patch may be on the inside, outside or both sides of the bag, but a patch comprising a myoglobin blooming agent should be positioned for contact with a myoglobin containing food product such as meat (which also includes meat bone), and the patch will shrink with the bag, thereby reducing the tendency of the patch to delaminate from the bag, or it may optionally be a nonshrink film that is adapted to otherwise conform to a shrinking bag. Most preferably, the interior surface food contact layer of the patch may further comprise the myoglobin blooming agent, such as a nitrite, nitrate or Fremy's salt, in combination with a suitable food contact polymer. For example, the inner layer can comprise an ethylene-vinyl acetate copolymer e.g. having 20% to 35% by weight vinyl acetate content, and e.g. including about 0.1-5% of the myoglobin blooming agent in a food contact surface.

Methods of Packaging

In another aspect of the invention, methods of packaging a myoglobin-containing food product are provided. Suitable meat products are preferably fresh meat, but may also be enhanced or processed meats, such as the meat products described above.

The meat product is desirably a fresh meat product provided within a period of time postmortem to provide a desired level of freshness and safety. Preferably, a food product comprising myoglobin is provided for packaging less than 20 days post-mortem, more preferably less than 14, 12, 10, 6, 5, 4, 3, 2, or 1 day. Typically, the food product is a fresh meat provided between about 2 days and 14 days post-mortem, and more preferably between about 2 days and about 12 days.

Fresh meat is typically packaged in a moist state. Typically, meat comprises moisture (water), protein and fat. Fresh meat can include about 60% to about 80% moisture content, with lean meats typically having higher moisture content. Fresh meat products such as ground beef, chicken and pork often have a moisture content of about 68% to about 75%, depending on the fat content of the meat (meats with higher fat contents tend to have lower moisture content and vice versa). Cured meats often have higher moisture content due to injection with water-based preserving compounds. Sausage products may have a lower moisture content. For example, pork sausage may have a moisture content of about 40% or higher. Preferably, the packaged meat product can have a moisture content of at least about 5%, 10%, 15%, 20%, 30%, 40%, 50%, 60%, 70%, 80% or more.

The meat product may be packaged in a suitable food package and/or packaging film, such as the packages and films described herein. Preferably, the meat product is contacted by the myoglobin blooming agent containing food contact surface of the packaging. The myoglobin blooming agent (MBA) preferably will contact the meat surface in an amount sufficient to produce a desired red color which preferably does not penetrate to an undesirable depth of the food thickness under reduced oxygen conditions (this color may take awhile to develop e.g. 1 to 5 days). Beneficially the MBA may be present on the film food contact surface (or on the myoglobin food surface) in an amount of from about 0.05 to 3 to 5 to 10 µmoles/in² and in increments of 0.1 µmole thereof. Greater or lesser amounts of MBA may be used and the color intensity may thereby be varied depending upon the relative presence or absence of myoglobin. The food contact layer preferably has between about 0.001 mg/in² and about 0.900 mg/in² of a myoglobin blooming agent such as $NaNO_2$. Also the packaging should maintain the food product in a reduced oxygen package environment having a reduced gaseous oxygen partial pressure. The reduced oxygen package may comprise an oxygen barrier layer having an oxygen transmission rate of less than about 310, 200, 100, 75, 50, 40, 30, 20 or 10 $cm^3/m^2/24$ hours measured at 0% relative humidity and 23° C. Preferably, the oxygen barrier layer has an oxygen transmission rate of less than about 310 $cm^3/m^2/24$ hours measured at 0% relative humidity and 23° C., more preferably less than about 75 $cm^3/m^2/24$ hours, and most preferably less than about 20 $cm^3/m^2/24$ hours.

In many packaging applications, such as vacuum packaging, heat shrinkable food packaging films are desirable. Heat shrinkable bags and pouches can be made with heat sealable layers. A typical food packaging pouch can include three sides heat sealed by the pouch manufacturer leaving one open side to allow product insertion. Flexible food package containers such as bags or pouches may be made by transversely cutting tubular stock of monolayer or multilayer film and cutting off the tube portion containing the sealed end; by making multiple spaced apart transverse seals on tubular stock and cutting open the side of the tube; by superimposing flat sheets of film and sealing on three sides; or by folding a flat sheet and sealing on two sides. A processor may then insert e.g. fresh, frozen, hard chilled, thawed, raw, enhanced, cured or processed meat, ham, poultry, primal or subprimal meat cuts, ground beef, or other myoglobin containing products, making a final seal to hermetically enclose the product in the bag. This final seal preferably follows gas evacuation (e.g. by vacuum removal). Flexible food packaging containers such as bags or pouches can be made by transversely sealing tubular stock of monolayer or multilayer film and cutting off the tube portion containing the sealed end; by making two spaced apart transverse seals on tubular stock and cutting open the side of the tube; by superimposing flat sheets of film and sealing on three sides; or by folding a flat sheet and sealing two sides. The final seal after insertion of a food product may be a clip, but is usually a heat seal similar to the initial seals produced by the bag manufacturer although the actual heat sealing equipment may vary. Hot bar and impulse sealers are commonly used to make heat seals.

The inventive film may also be used in embodiments employing trays e.g. as a lidding film or tray overwrap. Equipment such as tray sealers that are made by Ossid Corporation of Rocky Mount, N.C., USA or ULMA Packaging, Inc. of Woodstock, Ga., USA may be used to package poultry such as chicken or other meats. Tray packaging may optionally involve replacement of the gaseous environment within the package by one or more gases to provide some advantage such as to assist product preservation, but to enjoy preferred benefits of the present invention at least a portion of the oxygen barrier film should be in contact with a food surface under reduced oxygen conditions to fix color in that contact area in a manner where a consumer or potential purchaser may view the color fixed meat surface through a transparent portion of the film.

Suitably at least 10%, preferably at least 20% and more preferably at least 30% or 50% or more of the surface of the oxygen barrier film is transparent to allow visual perception of food color therethrough after packaging. Meats having a bright red color are believed to be more visible, and have greater definition to distinguish the meat's physical topography, texture, and color variation e.g. such as that found in marbling. It is further believed, without wishing to be bound by the belief, that the whites of meat components such as fats, skin and white muscle fibers are enhanced by having proximate myoglobin bound by myoglobin blooming agents which fix a bright red color as opposed to purplish, bluish or brownish colors. Thus, the whites appear whiter in poultry and other meats including beef and pork. This in turn causes consumers to have a perception of greater clarity of the meat surface which increases consumer confidence in their purchase over meats having less visible surface characteristics.

In an embodiment of the invention a method of manufacturing a vacuum package of fresh meat may be provided which comprises:
  a) supplying a container comprising a heat shrinkable film having a layer comprising a myoglobin blooming agent and wherein the film is substantially impermeable to oxygen;
  b) placing a retail cut of fresh meat within the container;
  c) removing the atmosphere within the container;
  d) causing transparent portion of the film to make direct contact with at least a portion of the meat surface;
  e) hermetically sealing the container to enclose the fresh meat and prevent contact of oxygen from outside the container therewith;
  f) shrinking the film to provide a compact package having a sufficiently reduced internal oxygen level to promote a meat surface favoring deoxymyoglobin or metmyoglobin and the corresponding purple and brown colorations associated therewith over formation of oxymyoglobin; and
  g) storing the package under refrigeration conditions for a sufficient time to permit the reducing activity of the enclosed meat to favor nitroxymyoglobin formation on the meat surface to an extent whereby a corresponding red color associated therewith is formed to produce a visibly red meat surface.

Variations of the above embodiment may utilize the wide selection of MBAs, polymers, films, attributes and parameters disclosed herein as will be recognized by one skilled in the art in view of the present teaching.

Food Packaging

In another embodiment, food packages are provided that comprise myoglobin-containing food product such as fresh meat. The food packages preferably include a heat shrinkable oxygen barrier packaging film comprising a myoglobin blooming agent as described above, but may also include heat shrinkable films in combination with a food product which has been surface coated with a myoglobin blooming agent prior to packaging.

In some embodiments, the heat-shrinkable food package comprises a heat sealant layer positioned at or near the interior surface of the package, for example as an interior layer. The sealant layers of the heat shrinkable food package are described above.

The heat-shrinkable food packages further comprise an oxygen barrier layer as part of the film forming the food package. The oxygen barrier layer can comprise any suitable material and in a multilayer embodiment is preferably positioned between the abuse resistant exterior layer and an interior food contact layer. An oxygen barrier layer may be an ethylene vinyl alcohol copolymer (EVOH) or PVDC. The gas barrier layers of the heat shrinkable food package are described above with reference to the multilayer heat shrinkable packaging films.

One or more tie layers may also be included. The tie layers of the heat shrinkable food package are described above with reference to the multilayer heat shrinkable packaging films.

Preferably, the food package is a case-ready meat product comprising a fresh meat product that includes myoglobin. Case-ready meat products can be generally defined as fresh meat that is prepackaged and optionally prelabeled at a centralized location and delivered to the retail market prepared for final sale. Increasingly, meat products such as ground beef, turkey and chicken products delivered to U.S. domestic supermarkets for retail sale are delivered in case-ready packaging. For many supermarkets, especially so-called "mega-grocery stores," case-ready meat products provide not only cost savings in terms of minimizing or eliminating on-site butchering and packaging, but also increased sanitation and decreased incidence of product spoilage.

Product packaging that preserves the desirable color of meat, especially fresh meat, can promote the merchantability and appeal of the meat product for consumers. To meet the increasing demand for case-ready meat products, the case-ready meat products preferably provide a specified weight and/or volume packaging of common meat products, such as chicken breast and ground beef. The case-ready meat product can include a thermoplastic flexible film to maintain freshness, such as a film as described herein. The meat product may be provided fresh, frozen, thawed, enhanced, processed or cooked, and the films advantageously provide protection at various temperatures. Selection of films for packaging food products can include consideration of such criteria as barrier properties, cost, durability, puncture resistance, flex-crack resistance, food packaging law compliance e.g. United States Food & Drug Administration (FDA) approval, machinability, optical properties such as gloss and haze, printability, sealability, shrinkability, shrink force, stiffness, and strength. Packaging that preserves desirable meat coloration can promote the merchantability of meat products.

In another aspect, the packaged food product includes a fresh meat contacting a thin plastic film comprising a myoglobin blooming agent on a food contact surface, stretched around a foam tray that supports the product. The film is preferably a multilayer film that is sufficiently non-permeable to oxygen so that the color of the meat can be preserved in a desirable color (e.g. red) for more than about three days, preferably for 5, 7, 10, 15 or more days. Preferably, the meat product is packaged in vacuum containers such as heat shrinkable pouches or bags, which are vacuum sealed and prevent oxygen contact with the meat until the package is opened. The vacuum container includes a food contact surface including the myoglobin blooming agent.

In prior art case ready applications the meat product is sometimes packaged in a modified atmosphere package ("MAP"), wherein the meat is maintained in a sealed pocket containing a headspace with an atmosphere that is different than ambient air. For example, a MAP can maintain red meat in carbon dioxide, with very low oxygen content e.g. in a multipack where the master package is subsequently opened and the contained individual packages in oxygen permeable films are exposed to the atmosphere thereby causing the meat to bloom red. Also, the preferred color of fresh meat can be promoted and maintained using a MAP with enriched oxygen content. Similarly a MAP with small concentrations of carbon monoxide (CO) can be used to cause and maintain a preferred red color of fresh meat. Methods of treating fresh meat with carbon monoxide prior to packaging have also been developed for case ready packaging applications. The bright red CO-myoglobin complex is referred to as carboxymyoglobin. The presence of carbon monoxide can also disfavorably impact sales of CO-containing meat products among consumers.

It is contemplated that the present invention may be used in combination with MAP. For example, in a tray package where the heat shrinkable film contacts a significant portion but not all of the food product's viewable surface, a CO containing atmosphere can be used to cause a desirable color on the food surface areas that do not make direct contact with the packaging film. This embodiment may beneficially be used e.g. in certain types of tray overwrap packaging where the film may typically be in contact with the top surface of the food but not in all places along the side or in tray or non-tray packages of irregular shaped items having gaps between adjacent meat surfaces e.g. such as may be found in bone in products such as whole birds or shaped products such as crown ribs for roasting.

In some embodiments, the heat-shrinkable food package can be a cook-in package, and optionally the food package need not comprise a heat sealable layer. "Cook-in" is the term used to indicate a film, casing or bag in which a foodstuff is pasteurized or cooked. This film or bag is used to hold together, protect and/or form the shape of the foodstuff by a food processor (manufacturer) during the cooking or pasteurization process after which the film may be removed (sometimes termed "stripped"), or may be left on as a protective barrier during shipping, and optionally left on during retail sale.

Food packages formed from multilayer films of the invention having two to fourteen or more layers are contemplated herein, where each layer is selected from the group consisting of: layers comprising an abuse or heat resistant polymeric composition, tie layers, oxygen barrier layers, moisture barrier layers, bulk layers and sealant layers. Preferably, the exterior surface layer comprises an abuse resistant and/or sealant layer. Also preferably, the interior surface layer is a sealant layer. Multilayer films may be made by any of the commonly known processes and techniques including for example coextrusion, coating lamination, lamination or combinations thereof in tubular or sheet form using various orientation or biaxial stretching techniques such as tentering, differential roller speed machine direction stretch, or bubble techniques such as trapped, double or triple bubble processes.

Preferably, the food packages are heat-shrunken, using heat shrinkable films having a total free shrink at 90° C. or less of at least about 10-110% or higher including any increment of 5% therebetween. For example, various embodiments of the heat-shrunken packages may have employed films having a total free shrink measured at 90° C. or less of about 10%, 15%, 20%, 25%, 30%, 35%, 40%, 45%, 50%, 55%, 60%, 65%, 70%, 75%, 80%, 85%, 90%, 95%, 100%, 105%, 110%, or greater.

Figure 5:
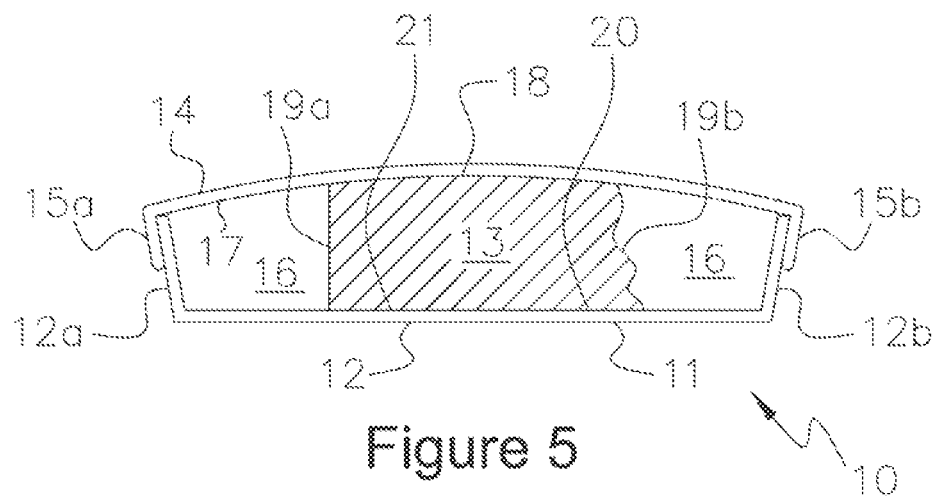
FIG. 5 shows a cross sectional schematic of a meat containing tray with shrink film overwrap.

Referring now to FIG. 5, a cross sectional schematic of a meat containing tray 10 is depicted. Tray 11 has a bottom 12 with integral side walls 12a and 12b supporting a retail cut of meat 13 such as pork. Shrink film 14 overwraps the tray 11 and provides a hermetic seal 15a and 15b all along the continuous sidewall 12a, 12b. The film 14 is shrunken into intimate contact with MBA containing food contact surface 17 in contact with meat surface 18. Meat sidewalls 19a, 19b are not in contact with the food contact layer 17 but instead are exposed to a modified atmosphere 16 of a gas such as carbon monoxide. The tray has an inside surface 20 which may also be coated with an MBA to fix color on the meat bottom surface 21.

Figure 6:
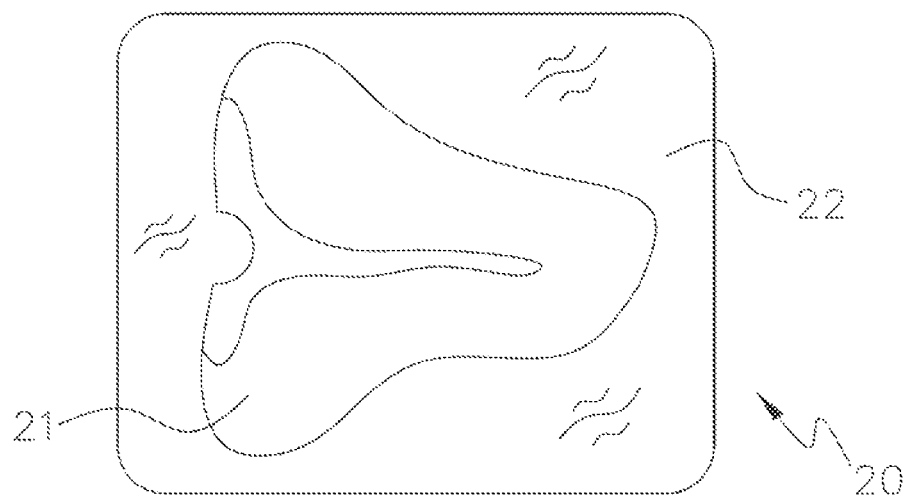
FIG. 6 shows a top view of a shrink film enclosed meat cut.

Referring now to FIG. 6 a top view of a package 20 depicts a myoglobin containing food 21 such as a bone in cut of meat wrapped in a shrunken shrink film 22 having a MBA coated food contact surface in contact with the meat. The film is transparent to allow perception of the color and meat surface characteristics.

Figure 7:
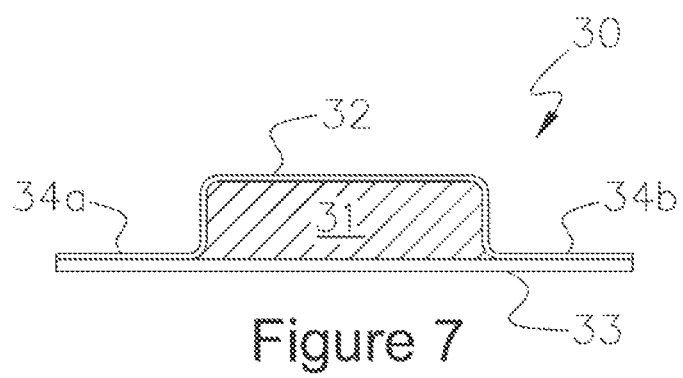
FIG. 7 shows a cross sectional schematic of a meat containing form shrink container.

Referring now to FIG. 7 a cross sectional schematic of a meat containing form shrink container 30 is depicted having a myoglobin containing cut of fresh meat 31 disposed in a thermoformed pocket 32 which is heat sealed to a heat shrinkable film 33 around the meat cut at heat seal 34a which is continuous and joins heat seal 34*b* to form a hermetic vacuum package having a reduced oxygen atmosphere with intimate contact between the MBA containing surfaces of film 32 and 33. The thermoformed pocket 32 may be formed from any film suitable for thermoforming, including, for example, blown films, cast films, oriented films and non-oriented films. Typically, a film having less than 10% shrink (i.e., non-shrink) is employed for the forming film.

In the following examples, all layers are extruded or coextruded as a primary tube, which is then biaxially oriented in a manner similar to that broadly described in the aforementioned U.S. Pat. Nos. 3,456,044; 5,759,648; 6,316,067; and 6,773,820; and published U.S. Patent Application No. 2004/0166262; where the primary tube leaving the die is inflated by a trapped volume of air, which is cooled after exiting the die with tap water and collapsed, and then oriented by reinflating to form a secondary tube termed a "bubble" by reheating to the film's orientation (draw) temperature range for biaxial orientation. The reheating can be accomplished by various means, for example, by radiant heaters or contact with hot air and/or water. Machine direction (MD) orientation is produced by pulling or drawing the film tube e.g. by utilizing multiple sets of nip rollers traveling at different speeds, and transverse direction (TD) orientation is obtained by radial bubble expansion. The oriented film is set by rapid cooling.

Biaxial orientation can be performed in any suitable manner, preferably using pressurized air to inflate the primary tube and mechanically stretching the film while at or above the orientation temperature. Cooling of oriented films can be accomplished by means of a concentric air ring or by contact with any cooling medium.

Experimental results and reported properties are based on the following test methods or substantially similar test methods unless noted otherwise.

Oxygen Gas Transmission Rate ($O_2$ GTR): ASTM D-3985-81

Water Vapor Transmission Rate (WVTR): ASTM F 1249-90

Gauge: ASTM D-2103

Melt Index: ASTM D-1238, Condition E (190° C.) (except for propene-based (>50% $C_3$ content) polymers tested at Condition TL (230° C.))

Melting point: ASTM D-3418, DSC with 5° C./min heating rate

Gloss: ASTM D-2457, 45° angle

Shrinkage values are defined to be values obtained by measuring unrestrained shrink of a 10.0 cm square sample immersed in water at 90° C. (or the indicated temperature if different) for five seconds. Four test specimens are cut from a given sample of the film to be tested. The specimens are cut into squares of 10.0 cm length in the machine direction (MD) by 10.0 cm length in the transverse direction (TD). Each specimen is completely immersed for 5 seconds in a 90° C. (or the indicated temperature if different) water bath. The specimen is then removed from the bath and the distance between the ends of the shrunken specimen is measured for both the machine direction (MD) and transverse direction (TD). The difference in the measured distance for the shrunken specimen and the original 10.0 cm side is multiplied by ten to obtain the percent of shrinkage for the specimen in each direction. The shrinkage of four specimens is averaged for the MD shrinkage value of the given film sample, and the shrinkage for the four specimens is averaged for the TD shrinkage value. As used herein the term "heat shrinkable film" means a film having an unrestrained shrinkage value of at least 10% in at least one direction at 90° C. The term "total free shrink" refers to the sum of the shrink percentages in the MD and TD directions.

The shrink force of a film is that force required to prevent shrinkage of the film and is determined from film samples taken from each film. Four film samples are cut 1" (2.54 cm) wide by 7" (17.8 cm) long in the machine direction and 1" (2.54 cm) wide by 7" (17.8 cm) long in the traverse direction. The average thickness of the film samples is determined and recorded. Each film sample is then secured between the two clamps spaced 10 cm apart. One clamp is in a fixed position and the other is connected to a strain gauge transducer. The secured film sample and clamps is then immersed in a silicone oil bath maintained at a constant, elevated temperature for a period of five seconds. During this time, the force in grams at the elevated temperature is recorded. At the end of this time, the film sample is removed from the bath and allowed to cool to room temperature whereupon the force in grams at room temperature is also recorded. The shrink force for the film sample is then determined from the following equation wherein the results are obtained in grams force per mil of film thickness (g/mil). Shrink Force ($g_F$/mil)=F/T wherein F is the force in grams and T is the average thickness of the film samples in mils.

Shrinkage values, shrink force, and free shrink are measured by the methods described above or tests similar thereto, unless otherwise specified. Other useful tests are provided by the following references, which are incorporated herein in their entirety: U.S. Pat. Nos. 6,869,686; 6,777,046 and 5,759,648.

Provided below are non-limiting examples of the compositions, films and packages disclosed herein. In all the following examples, unless otherwise indicated, the film compositions are produced generally utilizing the apparatus and method described in U.S. Pat. No. 3,456,044 (Pehlke), which describes a coextrusion type of double-bubble method, and in further accordance with the detailed description above. All percentages are by weight unless indicated otherwise.

Multilayer tubular films are made by a biaxial stretching orientation process. Films of 3, 4, 5, 6, 7, 8, 9 or more layers are contemplated. The inventive multilayer films may include additional layers or polymers to add or modify various properties of the desired film such as heat sealability, interlayer adhesion, food surface adhesion, shrinkability, shrink force, wrinkle resistance, puncture resistance, printability, toughness, gas or water barrier properties, abrasion resistance and optical properties such as gloss, haze, freedom from lines, streaks or gels. These layers may be formed by any suitable method including coextrusion, extrusion coating and lamination.

Examples 1-2

A monolayer and a two layer coextruded heat shrinkable oxygen barrier film are provided. The film compositions of Examples 1-2 are produced under similar conditions. For each example listed in Table 1 the components are blended in the indicated weight ratio followed by heat plastification and extrusion of a tube as generally described above. Draw point temperature and bubble cooling rates are adjusted to maximize bubble stability, and expected properties of each film are reported in Table 1. The films are extruded in the form of a seamless tube. The tubes are wound on reels and the end of each tube is secured by tape. Examples 1 and 2 represent identical films except that in the film of Example 2 the reeled tube is then annealed in a circulating hot air oven at about 38°

C. to dimensionally stabilize the tube. During annealing, the tube flat width is reduced by shrinkage.

The expected properties of an unannealed and annealed film of a contemplated embodiment of the present invention are reported in Examples 1 and 2 respectively. The amorphous nylon copolymer and copolyamide blend of Examples 1 and 2 may form a shrinkable film which is easy to orient with good optical properties including very high gloss. The copolyamide is a commercially available nylon 6/12 (Grilon CR9) and the blend may include added anti-oxidant and anti-block. The unannealed film of example 1 is expected to have very high free shrinkage relative to annealed Example 2. Annealing reduces the shrinkage.

A comparison of the expected haze, gloss and tensile strength properties of the unannealed film of Example 1 with the annealed film of Example 2 indicates that annealing may modify or improve some properties relative to unannealed film.

Both the annealed and unannealed casings are slugged with a concentrated aqueous solution of sodium nitrite and allowed to dry to produce a coating of myoglobin blooming agent on the interior casing surface in an amount of from about 0.05 to 10 μmoles/in$^2$.

An annealed sodium nitrite coated tube according to Example 2 of the present invention may be used as a ground beef, ground pork or sausage casing. This transparent tube may be stuffed with a beef and/or pork emulsion, and may be subsequently cooked. The resultant sausage casing is expected to promote and maintain a desirable red color prior to cooking and provide oxygen barrier properties having an oxygen transmission rate of less than 310 cm$^3$/m$^2$/24 hours measured at 0% relative humidity and 23° C. The desired color is expected to be maintained for at least 5 days and preferably at least 15, 25, 30 or more days after stuffing and color fixing/blooming and before cooking. Optionally, the encased product may be cooked and is expected to have a good yield with uniform adhesion of the casing to the stuffed meat.

TABLE 1

| # | Nylon Blend A | Nylon Blend B | A:B Wt. Ratio | Gloss | Tensile Strength × 10$^3$ (psi) MD/TD | Shrink % at 90° C. MD/TD |
|---|---|---|---|---|---|---|
| 1+ | 6/12 | amorphous nylon copolymer* | 4:1 | 90 | 23/23 | 51/49 |
| 2++ | 6/12 | amorphous nylon copolymer* | 4:1 | 98 | 20/24 | 14/9 |

*A nylon 6I/6T copolymer sold under the brand name Selar PA 3426
+Unannealed film
++Annealed film Examples 3-9

Biaxially stretched two layer oxygen barrier films having three and four component nylon blends in one layer coextruded with a second polyethylene heat sealable food contact layer may be made according to the present invention as demonstrated by the compositions and properties of the films described in Examples 3-9. Blends of an amorphous nylon copolymer such as nylon 6I/6T and a crystalline copolyamide having a melting point above 145° C. such as a commercially available nylon 6/12 (Grilon CR9) or nylon 6/69 may be made with one or more other nylon 6/12 copolymers, nylon 6/66 copolymers or nylon homopolymers such as nylon 6, nylon 11, and nylon 12.

Each two layer film is extruded and biaxially stretched (oriented) by a known double bubble extrusion process (See e.g. U.S. Pat. No. 3,456,044). In forming the primary film tube, the nylon resins are conventionally blended. The nylon blend and a polyethylene such as VLDPE are each heat plastified in separate conventional single screw extruders equipped with a standard commercially available polyethylene screw and the melts are brought together in a conventional die having a die diameter of about 1.25 inches. The extruder barrel temperature may range from 175° C. to about 235° C. and the die temperature may be set at about 224° C. The machine direction (MD) orientation ratio may be from about 2 to 2.5 and the transverse direction (TD) orientation ratio may be from about 2 to 3.

Two layer films having various nylon blend components are listed in Table 2 as Examples 3-9. In all of these examples the blends are expected to produce bioriented films having good shrink properties in both the machine direction and the transverse direction with shrinkage values similar to those indicated in Table 2.

The optional addition of nylon homopolymers may improve gas barrier properties by lowering permeability. In examples 7 and 9, the nylon 6 and nylon 12 polymers, are commercially available nylon homopolymers e.g. such as those sold under the respective brand names Grilon F40 (nylon 6) and Grilamid L25 (nylon 12) by Ems-Chemie (North America) Inc. of Sumter, S.C., USA. In example 8, the nylon 11 polymer may be a commercially available nylon homopolymer e.g. such as that previously available under the trade name Rilsan nylon 11 from Rilsan Corporation of Glen Rock, N.J. O$_2$TR values are expected to be less than the indicated values.

The films of Examples 3-9 may be sprayed on the polyethylene layer with a starch containing a myoglobin blooming agent e.g. as a blend of sodium nitrite, sodium nitrate, starch, and anti-oxidant before or after being fabricated into heat shrinkable bags and pouches by heat sealing the polyethylene layer to itself. The bags may be used to vacuum package beef, pork and poultry. The films coated with the myoglobin blooming agent may be used to vacuum package fresh meat on a polymeric oxygen barrier tray or in form shrink applications. Packages of meat so made are expected to develop and maintain a desirable color for at least 5, and preferably 10 and more preferably 15 or more days after packaging. The penetration of a pink or red color into the meat is desirably controlled to remain within about ¼ inch or less from the meat surface by adjusting the amount of agent on the surface to an appropriate value believed to be between about 0.05 to 10 μmoles/in$^2$.

TABLE 2

| # | Nylon Blend Components | | | | | SHRINK % at 90° C. M.D./T.D. | O₂TR cm³/m² 24 hr/ 1 atm |
|---|---|---|---|---|---|---|---|
| | Amorphous Nylon* wt. % | Nylon 6/12** mp >145° C. wt. % | Nylon 6/12*** wt. % | Other Nylon | wt. % | | |
| 3 | 10 | 72 | 18 | | | 30/20 | <100 |
| 4 | 20 | 72 | 8 | | | 40/40 | <100 |
| 5 | 18 | 57.6 | 14.4 | nylon 6/66+ | 10 | 30/20 | <50 |
| 6 | 18 | 57.6 | 14.4 | nylon 6/12++ | 10 | 40/40 | <50 |
| 7 | 18 | 57.6 | 14.4 | nylon 6+++ | 10 | 30/20 | <50 |
| 8 | 18 | 57.6 | 14.4 | nylon 11++++ | 10 | 30/30 | <50 |
| 9 | 18 | 57.6 | 14.4 | nylon 12+++++ | 10 | 30/30 | <50 |

*Amorphous nylon 6I/6T copolymer - Selar PA 3426 (trademark of DuPont).
**A nylon copolyamide of nylon 6/12 - Grilon CR9 (trademark of Ems-Chemie).
***A nylon copolyamide of nylon 6/12 - Grilon CA 6E (trademark of Ems-Chemie).
+Ultramid C33 (trademark of BASF).
++Zytel 151 (trademark of DuPont).
+++Grilon F40 (trademark of Ems-Chemie).
++++Rilsan (trademark of Arkema division of Total).
+++++Grilamid L25 (trademark of Ems-Chemie).

Example 10

A 40 by weight % solids sodium nitrite solution may be prepared by dissolving 8 kg of NaNO$_2$ in 12 kg of water. The solution is made with tap water at room temperature by gently agitating the water/nitrite mixture.

A polyethylene such as Dow ATTANE® 4201-G VLDPE (commercially available from Dow Chemical Company, Midland, Mich.) is loaded into the hopper of a gravimetric dosing unit that is positioned to feed the polymer into the main feed port of a twin screw extruder. The feeder is configured to dose the polyethylene at a rate of about 40 kg/h. The mixing elements of the twin screw extruder are arranged in a fashion that allow for feeding and melting of the VLDPE, injection and mixing of the water/nitrite solution, removal of the water, pressurization of a die and formation of continuous strands of a homogeneous and uniform polyethylene/nitrite blend.

The twin screw extruder is heated to about 200-330° F. and the extruder screws rotated with polyethylene introduced into a primary feed port at a rate of about 40 kg/hour with the nitrite/water mixture being injected into the molten polymer at a delivery rate of about 5 to 6 kg/h rate in a manner sufficient to deliver a nitrite concentration in polymer after water removal of about 5% by weight.

Mixing elements of the extruder may be arranged in a fashion to prevent the liquid water/nitrite solution from moving upstream to the primary feed port. For example, full bore orifice plugs may be used to prevent unwanted upstream migration.

Following injection, the water fraction of the nitrite/water solution may evaporate through a vent port. After mixing, the blend is extruded through a die, cooled in a water bath and pelletized and dried.

Examples 11-19

In examples 11-19, multilayer heat-shrinkable food packaging films are prepared from masterbatch pellets made in a manner similar to that described above in Example 10. The loading level of 5% sodium nitrite masterbatch pellets is varied to produce VLDPE films with different loadings of sodium nitrite. The sodium nitrite myoglobin blooming agent is included in the sealant layer of each film, which also forms the interior, food-contact layer of each multilayer film. Three, six and seven-layer films with a sealant layer comprising a myoglobin blooming agent in the sealant food-contact layer are prepared. Table 3 summarizes the configuration and composition of certain preferred heat-shrinkable multilayer films. The column designated "% MBA" provides the percentage of myoglobin blooming agent in the sealant layer. Columns designated "N/A" mean the indicated structural layer was omitted (except in Examples 13 and 14 where the core layer/ has the same formulation as the outer layer and the total of both layers is presented in the outer layer column). The basis weight and the percent thickness of each layer with respect to the multilayer film are also shown in Table 3. In each example of Table 3 PANS represents one or more processing aids and/or slip agents. Also, in each example the oxygen barrier layer denoted in Table 3 as PVDC comprises a 5.5:1 blend of vinylidene chloride-methylacrylate copolymer and vinylidene chloride-vinyl chloride copolymer and a minor amount (about 2-3%) of conventional plasticizing, lubricating and/or coloring additives such as ultramarine blue, e.g. as described in U.S. Pat. No. 4,798,751 which is hereby incorporated by reference in its entirety. While PVDC oxygen barrier layers are exemplified in Table 3, EVOH oxygen barrier layers can also be used or polyamides such as MXD6 or 6I/6T and blends of nylons and/or EVOH are contemplated.

The polymers represented in the examples are identified as follows unless otherwise noted.

EVA1 is a copolymer of ethylene and vinyl acetate (EVA) available from ExxonMobil Chemical Company of Houston, Tex., U.S.A. under the trademark EscoreneJ LD 701.ID. It reportedly has the following properties: 10.5 wt. % vinyl acetate content, 0.93 g/cm³ density, 0.19 dg/min. melt index, and a melting point (mp) of about 97EC.

EMA1 comprises an ethylene methyl acrylate copolymer which is a strong adhesive polymer. It has a reported density of about 0.948 g/cm³, a melt index of 2.0 dg/min. and a melting point of 93EC and a softening point of 49EC and is available under the trademark Emac+ SP 1330 from the Voridian division of Eastman Chemical Company, of Kingsport, Tenn., U.S.A.

EAO1 comprises a copolymer predominantly of ethylene with butene-1 monomer. It has a reported density of about 0.888 g/cm³, a melt index of 2.2 dg/min., a melting point of 70EC and is available under the trademark Exacts 4053 from ExxonMobil Chemical Company of Houston, Tex., U.S.A.

EAO2 is an ethylene α-olefin copolymer having a reported density of about 0.895 g/cm³, a melt index of 1.0 dg/min., a melting point of about 90EC and is available under the trademark Exacts 9523 from ExxonMobil Chemical Company.

EAO3 comprises an ethylene-α-olefin copolymer of very low density polyethylene sold by Dow Chemical Company of Midland, Mich., U.S.A. under the trademark ATTANEj XU 61509.32. It is a copolymer of ethylene and octene-1 reportedly having: a melt index of about 0.5 dg/min.; a density of about 0.912 g/cm³; and a dominant melting point of about 122-123 EC with a second significant peak at about 105 EC and a minor peak at about 119 EC.

EAO4 comprises an ethylene-α-olefin copolymer of very low density polyethylene sold by Dow Chemical Company of Midland, Mich., U.S.A. under the trademark ATTANEj XU 61520.16. It is a copolymer of ethylene and octene-1 with antioxidant reportedly having: a melt index of about 0.5 dg/min.; a density of about 0.912 g/cm³; a Vicat softening point of 95 EC; and a dominant melting point of about 122-123 EC, a second significant peak at about 104 EC, and a minor peak at about 119 EC.

The exterior layer of Examples 11 and 12 comprised a blend AA of 40 wt. % EVA1: 30 wt. % EAO1: 23.5% EAO3: 6.5% PA/S. In Table 3, the following blend designations apply. Blend BB is a combination of 18% EVA1: 60% EAO2: 19% EAO3: 3% PA/S. Blend CC is a combination of 18% EVA1: 60% EAO2: 15% EAO3: 7% PA/S. Blend DD is a combination of 22% EVA1: 45% EAO2: 28% EAO3: 5% PA/S. Blend EE is a combination of 27% EVA1: 45% EAO2: 25% EAO3: 3% PA/S. Blend FF is a combination of 27% EVA1: 45% EAO2: 25% EAO4: 3% PA/S. Blend GG is a combination of 49% EAO1: 45% EAO3: 6% PA/S.

TABLE 3

Multilayer Food Packaging Films Containing Myoglobin Blooming Agent (MBA)

| Ex. No. | No. Layers | % MBA | Outer Layer [Basis (% Thickness)] | Core Layer 1 [Basis (% Thickness)] | Tie Layer 1 [Basis (% Thickness)] | Oxygen Barrier Layer [Basis (% Thickness)] | Tie Layer 2 [Basis (% Thickness)] | Core Layer 2 [Basis (% Thickness)] | Sealant Layer [Basis (% Thickness)] |
|---|---|---|---|---|---|---|---|---|---|
| 11 | 3 | 0.80% | AA | N/A | N/A | PVDC | N/A | N/A | 16% MB(5%) 37% EVA1 30% EAO1 10% PA/S |
| 12 | 3 | 1.25% | [7.56 (25.1)] AA | N/A | N/A | [5.33 (17.7)] PVDC | N/A | N/A | [17.23 (57.2)] 25% MB(5%) 35% EVA1 30% EAO1 10% PA/S |
| 13 | 6 | 1.75% | [7.56 (25.1)] BB | N/A | 100% EMA1 | [5.33 (17.7)] PVDC | 100% EMA1 | GG | [17.23 (57.2)] 35% MB(5%) 14% VLDPE1 45% EAO1 6% PA/S |
| 14 | 6 | 1.25% | [9.13 (30.4)] BB | N/A | [1.50 (5.0)] 100% EMA1 | [4.96 (16.5)] PVDC | [1.50 (5.0)] 100% EMA1 | [9.16 (30.5)] GG | [9.16 (30.5)] 25% MB(5%) 37% EVA1 30% EAO1 8% PA/S |
| 15 | 7 | 1.75 | [8.83 (29.3)] CC | EE | [2.40 (8.0)] 100% EMA1 | [5.33 (17.7)] PVDC | [2.40 (8.0)] 100% EMA1 | [8.60 (28.6)] 100% EAO3 | [2.56 (8.5)] 35% MB(5%) 27% EVA1 30% EAO1 8% PA/S |
| 16 | 7 | 1.25 | [5.93 (19.2)] BB | [5.93 (19.2)] BB | [2.40 (7.8)] 100% EMA1 | [5.33 (17.3)] PVDC | [2.40 (7.8)] 100% EMA1 | [6.99 (22.7)] GG | [1.83 (5.9)] 25% MB(5%) 24% VLDPE1 45% EAO2 6% PA/S |
| 17 | 7 | 1.25 | [4.21 (14.0)] DD | [4.21 (14.0)] 100% EAO4 | [1.5 (5.0)] 100% EMA1 | [4.96 (16.5)] PVDC | [1.5 (5.0)] 100% EMA1 | [9.16 (30.5)] 100% EAO4 | [4.51 (15.0)] 25% MB(5%) 43.5% VLDPE2 22% EVA1 9.5% PA/S |
| 18 | 7 | 1.25 | [7.26 (18.8)] CC | [7.26 (18.8)] FF | [2.57 (6.7)] 100% EMA1 | [6.35 (16.5)] PVDC | [2.57 (6.7)] 100% EMA1 | [9.95 (25.8)] 100% EAO4 | [2.56 (6.6)] 25% MB(5%) 45% EAO2 18% VLDPE2 12% PA/S |
| 19 | 7 | 1.75 | [7.26 (18.8)] CC | [7.26 (18.8)] FF | [2.57 (6.7)] 100% EMA1 | [6.35 (16.5)] PVDC | [2.57 (6.7)] 100% EMA1 | [9.95 (25.8)] 100% VLDPE2 | [2.56 (6.6)] 35% MB(5%) 45% EAO2 8% VLDPE2 12% PA/S |
| | | | [7.26 (18.8)] | [7.26 (18.8)] | [2.57 (6.7)] | [6.35 (16.5)] | [2.57 (6.7)] | [10.68 (27.7)] | [1.83 (4.8)] |

% MBA = percentage of myoglobin blooming agent in food contact layer
Basis = weight basis in pounds per 3000 square feet;
% Wt = weight percent of multilayer film
MB(5%) is a masterbatch as defined in Example 10
N/A = layer is not present in structure In Examples 11-19, one extruder is used for each layer and the heat plastified resins from each extruder are introduced to a 3-layer die for examples 11 and 12, and a 7-layer spiral plate coextrusion die for examples 13-19. To make a six-layer film from a seven layer spiral plate coextrusion die, the resin or resin mixture to form an individual layer can be extruded through more than one die positions to produce one layer from two or more die locations. For example, the outer layer of films 13 and 14 is made by coextruding the component materials from two portions (i.e. outer layer and core layer 1) of the seven layer die to form one continuous outer layer in the film. The weight ratios of each layer are given in Table 3 as the basis weight. The thickness of the film layer as a percentage of the total film thickness is also provided in Table 3.

For each layer, the resin or resin mixture is fed from a hopper into an attached single screw extruder where the resin and/or mixture is heat plastified and extruded through a die into a primary tube and cooled. The extruded multilayer primary tube is cooled by spraying with cold tap water (about 40°-60° F.).

The cooled primary tube is flattened by passage through a pair of nip rollers whose speed is controlled to neck down the primary tube to adjust the tube circumference or flatwidth. A flattened tube of about 2-12 inches or more flatwidth is preferred. The cooled flattened primary tube is reheated, biaxially stretched, and cooled. The cooled film is flattened, and the biaxially stretched and biaxially oriented film is wound on a reel. The machine direction (MD) draw or orientation ratio is about 4:1 to 5:1 and the transverse direction (TD) bubble or orientation ratio is about 3:1 to 4:1. The draw point or orientation temperature is below the predominant melting point for each layer oriented and above that layer's glass transition point. Draw point temperature, bubble heating and cooling rates and orientation ratios are generally adjusted to maximize bubble stability and throughput for the desired amount of stretching or orientation. Exemplary values expected for the free shrink and other properties such as gauge thickness, gloss, and oxygen transmission rate of the films described in Table 3 are given in Table 4 below. The films 11-19 are preferably made with a thickness of between about 1.5 and 2.5 mils. The ratio of the basis weights in Table 3 can be proportionally varied to provide films having different total thicknesses e.g. from about 1.0 to 5.0 mils, with comparable relative thicknesses between layers. Films may be made with any suitable thickness with suitably sized equipment and appropriate parameter selection which may be determined by those skilled in the art without undue experimentation. The films are transparent and expected to have good optical properties including haze values which may be 35 to 15% or less. The shrink force values are expected to be typical for films made by the double bubble process and in the range of e.g. of about 35 to 75 Kg/cm in each of the MD and TD at 90° C., and in the range of about 15 to 55 Kg/cm for residual shrink force at room temperature (~20-23° C.) Higher and lower values as desired may be obtained by altering process parameters and/or film formulations without undue experimentation. Shrinkage values at lower temperatures are expected to provide at least 10% shrink in at least one of the MD and TD and preferably both the MD and TD at lower temperatures such as 80° C. and 74° C. Exemplary values of expected film properties may also be seen in U.S. Pat. Nos. 6,815,023; 6,773,820; 6,316,067; and 5,759,648. Exemplary values of certain expected properties are reported in Table 4 below.

TABLE 4

| Ex. No. | Gauge mil (μ) | MD Shrink (90° C.) % | TD Shrink (90° C.) % | Total % Free Shrink | $O_2TR$ $cm^3/m^2/$ 24 hrs/ at 1 atm, 0% RH & 23° C. | Gloss at 45° |
|---|---|---|---|---|---|---|
| 11 | 2 (50) | 55 | 60 | 115 | 0.9-1.5 | 65-75 |
| 12 | 2 (50) | 55 | 60 | 115 | 0.9-1.5 | 65-75 |
| 13 | 2 (50) | 54 | 60 | 114 | 0.9-1.5 | 65-75 |
| 14 | 2 (50) | 55 | 60 | 115 | 0.9-1.5 | 65-75 |
| 15 | 2 (50) | 55 | 60 | 115 | 0.9-1.5 | 65-75 |
| 16 | 2 (50) | 55 | 60 | 115 | 0.9-1.5 | 65-75 |
| 17 | 2.5 (63) | 48 | 55 | 103 | 0.9-1.5 | 65-75 |
| 18 | 2.5 (63) | 48 | 55 | 103 | 0.9-1.5 | 65-75 |
| 19 | 2.5 (63) | 48 | 55 | 103 | 0.9-1.5 | 65-75 |

While the values for shrink at 90° C. in Table 4 are typical target values based on repeated trials, the free shrink can vary between trials Meat such as fresh poultry or pork inserted into pouches and bags made from the above films followed by evacuation of the atmosphere within the bag and sealing to provide a hermetic seal and shrinking by brief exposure to elevated temperatures to effect the same will result in a transfer of the MBA to the meat surface and within about 3 days or less promote, cause and/or fix a desired color bloom which may last many weeks when the oxygen barrier vacuum package is stored under refrigeration, conditions. The same effect may be obtained in other myoglobin containing products however it is expected that for products having a high concentration of myoglobin such as beef a much higher amount of MBA may be need to achieve the desired effect. Due to the competing action of other moieties for attachment to the heme site insufficient MBA may not only not produce the desired color change but an undesirable purple or brown may be apparent in the absence of sufficient MBA. For poultry or pork it is expected that amounts of MBA in the range of 0.01 to 2 (a preferred range e.g. for typical cuts of pork is from at least 0.05 to 1.25) μmole/inch$^2$ of the myoglobin blooming agent on a food contact surface may be sufficient to produce the desired color e.g. a reddish hue, while for beef higher concentrations above 2 are desired.

For beef it is expected that amounts of at least 5% or more of an MBA such as sodium nitrite may be needed in the food contact layer.

In some embodiments, the film, bag, process and package provided herein comprise heat sealable, oxygen and moisture barrier films for holding a foodstuff during cooking and/or for packaging for sale of such a foodstuff after a pasteurization or cooking period.

In another embodiment of the invention, A food package may comprise a myoglobin-containing food product such as fresh meat having a water content of at least 5 wt. %; and a container comprising a heat shrinkable, oxygen barrier thermoplastic film having a polymeric food contact layer and a tray; wherein the container encloses the food product in a reduced oxygen environment; and the food product is maintained in a modified atmosphere comprising a nitrogen or sulfur containing gaseous myoglobin blooming agent, or mixtures thereof. The MBAs described throughout this specification may also be used in this embodiment. It is further contemplated that either gaseous or non-gaseous MBAs may be used as well as combinations thereof in various embodiments of the invention.

It should be appreciated that films and packages made according to the present invention may be made and employed which are free from marinades, flavorants, food grade water soluble adhesives, starches, spices, sodium chloride, animal or vegetable oils and the like and other compounds described herein as optional ingredients which may be coated or otherwise present on an exterior or interior packaging film surface.

Examples 20-33

Examples 20-33 describe various methods that may be used to produce a film contact surface having MBA thereon. Examples 20 to 24 describe various methods that may be used to prepare a masterbatch containing an MBA for subsequent use in making various film embodiments according to the present invention. Additional information on these methods are disclosed in a U.S. patent application to Nelson, et al. entitled, "Process for Introducing an Additive into a Polymer Melt" filed Apr. 20, 2006 which application is hereby incorporated by reference in its entirety. Examples 25 to 33 describe methods for surface application by various means.

Example 20

Sodium nitrite powder (Rapauno Products $NaNO_2$ obtained from Hydrite Chemical Company, Brookfield, Wis.) and Dow ATTANE® 4201-G VLDPE (obtained from Dow Chemical Company, Midland, Mich.) are combined to form a masterbatch with a corotating twin screw extruder. The extruder is heated to 330° F. and the sodium nitrite and VLDPE are simultaneously added to the primary feed port. Selections of the sodium nitrite and VLDPE addition rates are made such that the composition of the mixture is 95% VLDPE and 5% sodium nitrite by weight. The twin screw extruder is configured to disperse the sodium nitrite powder such that the individual powder particles are surrounded by polymer. The discharge of the extruder is fitted with a die of geometry appropriate for shaping the sodium nitrite-VLDPE mixture into continuous strands. The strands are cooled in a water bath. At the exit of the water bath, an air knife removes some of the moisture clinging to the surface of the stands. After leaving the influence of the air knife, the strands are cut into discrete pellets by a rotating knife-style pelletizer. Those pellets are dried in a convection oven at about 50° C., packed in aluminum foil containing bags and stored for use.

Example 21

Repauno Products $NaNO_2$ is passed through a rotary pulverizer (e.g., Wiley Mill obtained from Brabender GmbH and Company, Duisburg, Germany). The rotary pulverizer reduces the average particle size of the sodium nitrite powder. The pulverized sodium nitrite is combined with Dow ATTANE® 4201-G VLDPE in the same proportions using the same technique described in Example 20 to form a masterbatch.

Example 22

A 40% solids sodium nitrite solution is prepared by dissolving 8 kg of Repauno Products $NaNO_2$ in 12 kg of water. The solution is made with tap water at room temperature by gently agitating the water/nitrite mixture.

The nitrite solution is spray dried (e.g., Mobile Minor spray dryer from Niro, Inc. Columbia, Md.) to form a homogeneous powder. The spray dried sodium nitrite is combined with Dow ATTANE® 4201-G VLDPE in the same proportions using the same technique described in Example 20 to form a masterbatch.

Example 23

A 40% solids sodium nitrite solution is prepared in a manner described in Example 22.

Dow ATTANE® 4201-G VLDPE is loaded into the hopper of a gravimetric dosing unit that is positioned to feed the polymer into the main feed port of a corotating twin screw extruder. The extruder is heated to 330° F. and the VLDPE is continuously metered into the extruder where it melts. The 40% solids nitrite/water solution is injected into the molten VLDPE with a gear pump at a rate such that the concentration of the solution is 11.6% by weight. The water portion of the solution vaporizes in the extruder and is removed via a vent port. The remainder of the composition is substantially a mixture of VLDPE and sodium nitrite with a sodium nitrite content of 5% by weight. The resultant mixture is shaped into strands with a die, cooled with water, blown dry with air, chopped into pellets, dried and packaged as described in Example 20.

Example 24

A 4% solids sodium nitrite solution is prepared by dissolving 0.25 kg of Repauno Products $NaNO_2$ in 6 kg of methanol (from Hydrite Chemical Company, Brookfield, Wis.).

The sodium nitrite/methanol solution is combined with Dow ATTANE® 4201-G VLDPE in the same proportions using the same technique described in Example 23 to form a masterbatch. The resultant blend is 0.5% by weight of sodium nitrite.

Examples 25

Spray-dried sodium nitrite is prepared with the materials and method described in Example 22. The powder is applied in a uniform layer using an electrostatic sprayer (e.g., obtainable from Oxy-Dry Corporation, Itasca, Ill.) to the food contact surface of a shrink film. The film is fabricated into a shrink bag.

Example 26

A 40% solids sodium nitrite solution is prepared in a manner described in Example 22.

A continuous shrink film tubing is passed between two sets of nip rollers, one set located above the other. The nips are separated by sufficient space such that the tubing is able to inflate with injected air and exhibit a circular cross section without wrinkling. The inflated tubing is momentarily slit and the air cavity is "slugged" (i.e., replaced) by the 40% solids sodium nitrite solution. The slitting device is removed and the inner surface of the tubing is coated with the sodium nitrite solution.

Example 27

A 40% solids sodium nitrite solution is prepared in a manner described in Example 22.

The food contact surface of a shrink film is coated with a 40% solids solution of sodium nitrite. The solution is applied to the food contact surface and is metered with a #8 wire wound rod (e.g., Mayer rod or equalizer). Following coating, the water is removed using a heated, forced air oven.

Example 28

A 40% solids sodium nitrite solution is prepared in a manner described in Example 22.

The food contact surface of a shrink film is coated with a 40% solids solution of sodium nitrite. The technique is the same as described in Example 27 except that the metering method uses a smooth rod.

Example 29

A 40% solids sodium nitrite solution is prepared in a manner described in Example 22.

The food contact surface of a shrink film is coated with a 40% solids solution of sodium nitrite. The technique is the same as described in Example 27 except that the metering method uses a gravure applicator.

Example 30

A 40% solids sodium nitrite solution is prepared in a manner described in Example 22.

The food contact surface of a shrink film is coated with a 40% solids solution of sodium nitrite. The technique is the same as described in Example 27 except that the metering method uses a flexographic printing plate.

Example 31

A 40% solids sodium nitrite solution is prepared in a manner described in Example 22.

The food contact surface of a shrink film is coated with a 40% solids solution of sodium nitrite. The technique is the same as described in Example 27 except that the metering method uses transfer rolls.

Example 32

A 40% solids sodium nitrite solution is prepared in a manner described in Example 22.

The food contact surface of a shrink film is coated with a 40% solids solution of sodium nitrite. The technique is the same as described in Example 27 except that the metering method uses a spray applicator.

Example 33

A 40% solids sodium nitrite solution is prepared in a manner described in Example 22.

A coating composition is prepared by combining 5 g of a polyethylene oxide polymer, 5 g of distilled water and 0.3 g of the 40% solids sodium nitrite solution. The food contact surface of a shrink film is coated with the coating composition using the technique described in Example 27.

The shrink films made according to the above methods are all believed to be suitable to package a myoglobin containing food product and fix a desired color e.g. red within 72 hours after packaging under a reduced oxygen e.g. vacuum packaging operation. The intimate contact between the food contact layer having the MBA and the meat surface effects a transfer to the meat producing the desired color, which is expected to last for many weeks.

The MBA coated shrink films according to the present invention may also be used in form shrink applications such as those made using Multivac R 550, R250 and R 150 thermoforming machines Films, bags and packages may also employ combinations of characteristics as described in one or more embodiments and selected therefrom.

The above examples are illustrative only, and should not be interpreted as limiting since further modifications of the disclosed embodiments will be apparent to those skilled in the art in view of this teaching. All such modifications are deemed to be within the scope of the invention disclosed herein.

What is claimed is:

1. A heat-shrinkable food packaging film having an interior surface and an exterior surface, the film comprising:
    (a) food contact layer comprising a myoglobin blooming agent,
    wherein the myoglobin blooming agent is selected from the group consisting of: Fremy's salt, nitrate salts having the formula ($MNO_3$) and inorganic nitrites ($MNO_2$), where the counter ion (M+) is selected from the group consisting of: alkali metals, alkaline earth metals, transition metals, protonated primary, secondary or tertiary amines, quaternary amines and ammonium; and
    (b) an oxygen barrier layer;
    wherein the film has a free shrink value at 90° C. or less of at least 10% in at least one direction;
    wherein the myoglobin blooming agent is present on the food contact layer surface in a concentration sufficient to produce a desirable surface coloration of the meat product and prevent undesirable extension of the color into the body of the meat product;
    wherein the concentration of myoglobin blooming agent is between 0.001 to 0.900 mg/in$^2$.

2. A film, as defined in claim 1, wherein the film has a total free shrink value at 90° C. or less of at least 60%.

3. A film, as defined in claim 1, wherein the oxygen barrier layer comprises PVDC, EVOH, polyamide, nanocomposite, PET, or a combination thereof.

4. A film, as defined in claim 1, wherein the film has an oxygen transmission rate of less than 310 cm$^3$/m$^2$/24 hours measured at 0% relative humidity and 23° C.

5. A film, as defined in claim 1, wherein the film has an oxygen transmission rate of less than about 75 cm$^3$/m$^2$/24 hours measured at 0% relative humidity and 23° C.

6. A film, as defined in claim 1, wherein the film has an oxygen transmission rate of less than 20.0 cm$^3$/m$^2$/24 hours measured at 0% relative humidity and 23° C.

7. A film, as defined in claim 1, wherein the film further comprises an exterior surface layer (c), and wherein the oxygen barrier layer (b) is positioned between layer (a) and layer (c).

8. A film, as defined in claim 7, wherein the film is at least five polymeric layers and has a first tie layer (d) positioned between the food contact layer (a) and oxygen barrier layer (b) and a second tie layer (e) positioned between the oxygen barrier layer (b) and the exterior surface layer (c).

9. A film, as defined in claim 7, wherein the exterior surface layer (c) comprises a homopolymer or a copolymer of nylon, polyethylene terephthalate, polyolefin, or blends thereof.

10. A film, as defined in claim 1, wherein the food contact layer (a) comprises a homopolymer or a copolymer of a polyolefin or blends thereof.

11. A film, as defined in claim 7, wherein at least one layer of the film is crosslinked.

12. A film, as defined in claim 7, wherein at least one layer of the film is irradiatively crosslinked.

13. A film, as defined in claim 1, further comprising at least one additional layer of a polyamide, a polyester, a polyethylene, a polypropylene, a polybutylene, a polystyrene, a polyurethane, a polyacrylamide, an anhydride-modified polymer, an acrylate-modified polymer, or copolymers or blends thereof.

14. A film, as defined in claim 1 wherein the myoglobin blooming agent containing layer further comprises at least one of an antioxidant, a slip agent, an antiblock agent, a colorant, a flavorant, an odorant, an organoleptic agent, a coefficient of friction modifying agent, a lubricant, a surfactant, an encapsulating agent, an oxygen scavenger, a pH modifying agent, a film forming agent, an emulsifier, a polyphosphate, a humectant, a drying agent, an antimicrobial agent, a chelating agent, a binder, a starch, a polysaccharide or a combination thereof.

15. A film, as defined in claim 1, wherein the food contact layer comprises between about 0.10 weight % and about 5.0 weight % of the myoglobin blooming agent.

16. A film, as defined in claim 1, wherein the food contact layer comprises at least about 0.10 weight % and less than 2.0 weight % of the myoglobin blooming agent.

17. A film, as defined in claim 1, wherein the food contact layer has on its food contact surface of from 0.01 to 10 $\mu$mole/inch$^2$ of the myoglobin blooming agent.

18. A film, as defined in claim 1, wherein the food contact layer has on its food contact surface of from 0.01 to 2 $\mu$mole/inch$^2$ of the myoglobin blooming agent.

19. A film, as defined in claim 1, wherein the food contact layer has at least 0.1 mg/inch$^2$ of the myoglobin blooming agent.

20. A film, as defined in claim 1, wherein the food contact layer has an its food contact surface less than 0.25 mg/inch$^2$ of the myoglobin blooming agent.

21. A film, as defined in claim 1, wherein the food contact layer comprises a heat sealable polymer.

22. A film, as defined in claim 1, wherein the food contact layer comprises a heat sealable polymer selected from the group of polyolefin, polyethylene, VLDPE, LLDPE, LDPE, HDPE, ethylene alpha-olefin copolymers, polypropylene, polybutylene, and ionomer.

23. A film, as defined in claim 1, wherein at least 0% of the surface area of the film is transparent.

24. A film, as defined in claim 1, wherein the film has a gloss value of at least 70 at 45°.

* * * * *